(12) United States Patent
Toriyama et al.

(10) Patent No.: US 10,928,679 B2
(45) Date of Patent: Feb. 23, 2021

(54) OPTICAL COMPENSATION ELEMENT, LIQUID CRYSTAL LIGHT VALVE ASSEMBLY, AND LIQUID CRYSTAL PROJECTOR APPARATUS

(71) Applicant: SONY CORPORATION, Tokyo (JP)

(72) Inventors: Akiko Toriyama, Kanagawa (JP); Koichi Nagasawa, Kanagawa (JP); Tsuyoshi Okazaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/326,855

(22) PCT Filed: Jul. 26, 2017

(86) PCT No.: PCT/JP2017/027001
§ 371 (c)(1),
(2) Date: Feb. 20, 2019

(87) PCT Pub. No.: WO2018/047497
PCT Pub. Date: Mar. 15, 2018

(65) Prior Publication Data
US 2019/0204647 A1 Jul. 4, 2019

(30) Foreign Application Priority Data
Sep. 12, 2016 (JP) .............................. JP2016-177297

(51) Int. Cl.
*G02F 1/13363* (2006.01)
*G02B 5/30* (2006.01)
(Continued)

(52) U.S. Cl.
CPC ....... *G02F 1/13363* (2013.01); *G02B 5/3083* (2013.01); *H04N 9/3197* (2013.01); *G02F 1/133528* (2013.01)

(58) Field of Classification Search
CPC ..... G02F 1/13363; G02F 2001/133633; G02F 2001/133634; G02F 2001/133638;
(Continued)

(56) References Cited

U.S. PATENT DOCUMENTS 6,392,775 B1* 5/2002 Drake ................ G11B 7/08564
359/224.1
2003/0193636 A1 10/2003 Allen et al.
(Continued)

FOREIGN PATENT DOCUMENTS

AU 2003220099 A1 11/2003
CN 1646976 A 7/2005
(Continued)

OTHER PUBLICATIONS

International Search Report and Written Opinion of PCT Application No. PCT/JP2017/027001, dated Oct. 24, 2017, 10 pages of ISRWO.

*Primary Examiner* — Angela K Davison
(74) *Attorney, Agent, or Firm* — Chip Law Group

(57) ABSTRACT

An optical compensation element includes a first member that includes a first transparent substrate, a first alignment film, and a first phase difference layer and a second member that includes a second transparent substrate, a second alignment film, and a second phase difference layer. In the optical compensation element, a first inorganic barrier layer is formed on a surface of the first phase difference layer, where the surface faces the second member a second inorganic barrier layer is formed on a surface of the second phase difference layer, where the surface faces the second member and the first inorganic barrier layer and the second inorganic barrier layer are bonded by an adhesive layer.

15 Claims, 11 Drawing Sheets

(51) Int. Cl.
*H04N 9/31* (2006.01)
*G02F 1/1335* (2006.01)

(58) Field of Classification Search
CPC ............ G02F 2413/04; G02F 2413/11; G02F 2201/34; G02F 2201/346; G02F 2201/307; G02B 5/3083; G02B 1/113; G02B 1/115; G03B 21/00; G03B 21/14; H01L 33/44; H01L 51/5281
See application file for complete search history.

(56) References Cited

U.S. PATENT DOCUMENTS

| | | | |
|---|---|---|---|
| 2005/0083464 A1 | 4/2005 | Allen et al. | |
| 2006/0221286 A1* | 10/2006 | Allen | G02B 5/3083 349/121 |
| 2008/0151163 A1* | 6/2008 | Sekiuchi | B29D 11/0073 349/117 |
| 2009/0219455 A1 | 9/2009 | Maruyama et al. | |
| 2015/0092117 A1* | 4/2015 | Koike | G02F 1/133632 349/5 |

FOREIGN PATENT DOCUMENTS

| | | |
|---|---|---|
| CN | 101346660 A | 1/2009 |
| CN | 107076916 A | 8/2017 |
| EP | 1497690 A1 | 1/2005 |
| JP | 2004-046097 A | 2/2004 |
| JP | 2005-523469 A | 8/2005 |
| JP | 2006-163070 A | 6/2006 |
| JP | 2006-184872 A | 7/2006 |
| JP | 2008-058427 A | 3/2008 |
| JP | 2008-112004 A | 5/2008 |
| JP | 2008-157993 A | 7/2008 |
| JP | 2009-128855 A | 6/2009 |
| JP | 2010-117537 A | 5/2010 |
| JP | 5272734 B2 | 8/2013 |
| JP | 2016-105166 A | 6/2016 |
| KR | 10-2005-0013536 A | 2/2005 |
| KR | 10-2008-0070639 A | 7/2008 |
| KR | 10-2017-0085511 | 7/2017 |
| TW | 200305757 A | 11/2003 |
| TW | 200720754 A | 6/2007 |
| TW | 201625999 A | 7/2016 |
| WO | 2003/089981 A1 | 10/2003 |
| WO | 2007/052488 A1 | 5/2007 |
| WO | 2007052488 A1 | 5/2007 |
| WO | 2008/081919 A1 | 7/2008 |
| WO | 2016/080431 A1 | 5/2016 |

* cited by examiner

OPTICAL COMPENSATION ELEMENT, LIQUID CRYSTAL LIGHT VALVE ASSEMBLY, AND LIQUID CRYSTAL PROJECTOR APPARATUS

CROSS REFERENCE TO RELATED APPLICATIONS

This application is a U.S. National Phase of International Patent Application No. PCT/JP2017/027001 filed on Jul. 26, 2017, which claims priority benefit of Japanese Patent Application No. JP 2016-177297 filed in the Japan Patent Office on Sep. 12, 2016. Each of the above-referenced applications is hereby incorporated herein by reference in its entirety.

TECHNICAL FIELD

The present disclosure relates to an optical compensation element, a liquid crystal light valve assembly, and a liquid crystal projector apparatus.

BACKGROUND ART

A liquid crystal projector apparatus that performs optical modulation on light emitted from a light source by using a liquid crystal light valve (a spatial light modulator) so as to form an image and that projects this image onto a projection surface such as a screen is well-known. In a three-plate type liquid crystal projector apparatus, for example, light emitted from a light source is separated into red light, green light, and blue light, rays of light of respective colors are modulated on the basis of image information or an image signal in three liquid crystal light valves, and the modulated rays of light of the respective colors are synthesized and are magnified and projected onto a projection surface. As the liquid crystal light valve, a liquid crystal valve that is similar to an active matrix drive type liquid crystal display driven by a thin-film transistor (TFT) is used, for example. Furthermore, as a display method of the liquid crystal light valve described above, a vertical alignment (VA) mode has become the mainstream in order to achieve a high luminance, a high contrast, a high definition, and a prolonged life. A vertical alignment mode liquid crystal light valve has, for example, a structure in which a first polarizing plate, a first substrate, a liquid crystal layer, a second substrate, and a second polarizing plate are laminated. In a liquid crystal projector apparatus, the vertical alignment mode liquid crystal light valve is arranged in an optical path from a light source, and light enters the first substrate via the first polarizing plate. The second polarizing plate is arranged so as to have a crossed Nichol relationship with respect to a linearly polarized state of the light that enters the first substrate. In the vertical alignment mode liquid crystal light valve, a black display is conducted when a driving voltage is not applied, and a white display is conducted when the driving voltage is applied. In other words, a normally black display is conducted.

As described above, the vertical alignment mode liquid crystal light valve has a structure in which liquid crystal molecules are aligned perpendicularly to a substrate when the driving voltage is not applied, and the linearly polarized state of incident light is hardly affected by the liquid crystal molecules, and the incident light passes through the liquid crystal layer. Accordingly, in principle, an extremely high contrast can be realized by arranging the second polarizing plate so as to have a crossed Nichol relationship with respect to the linear polarized state of the light that enters the first substrate via the first polarizing plate.

Meanwhile, in a case where pretilt processing has not been performed and in other words, in a case where the angles of the directors of liquid crystal molecules with respect to a normal direction of a substrate are 0 degrees, when the driving voltage is applied, the liquid crystal molecules that are aligned in a direction perpendicular to the substrate tilt in such a way that the directors of the liquid crystal molecules face an arbitrary azimuth in the in-plane direction of the substrate. In the behavior described above of the liquid crystal molecules in response to the driving voltage, the azimuth of the director of each of the liquid crystal molecules deviates, and an alignment state as a whole is disturbed.

A vertical alignment mode liquid crystal light valve is well-known in which a pretilt angle (an angle that is not 0 degrees with respect to the normal direction of a substrate, for example, 2 degrees to 6 degrees) is imparted to liquid crystal molecules when the driving voltage is not applied. By imparting the pretilt angle to the liquid crystal molecules, as described above, when the driving voltage is applied, the liquid crystal molecules tilt in such a way that the directors of the liquid crystal molecules face a prescribed azimuth in the in-plane direction of the substrate, and therefore the problem described above in a liquid crystal light valve on which pretilt processing has not been performed is not likely to occur.

However, in a case where the pretilt angle is imparted to the liquid crystal molecules, linearly polarized light incident from the normal direction of the substrate becomes elliptically polarized light due to the occurrence of a phase difference. This results from the anisotropy of a refractive index of the liquid crystal molecules. Accordingly, part of light to be originally shielded by the second polarizing plate passes, and this becomes one of the causes of a reduction in contrast.

In order to compensate for a reduction in contrast described above, a technique is known for compensating for a phase difference that has been generated due to a pretilt angle in a liquid crystal light valve by using an optical compensation plate (see, for example, Japanese Patent Application Laid-Open No. 2008-112004). Examples of the configuration of the optical compensation plate described above include a configuration formed by bonding, with an adhesive layer, two phase difference layers that have been formed using a liquid crystal material film aligned in a prescribed state. In a liquid crystal light valve portion of a liquid crystal projector, by arranging, for example, an incident-side polarizing plate, a pair of phase difference layers (optical compensation elements), a liquid crystal light valve, and an emitting-side polarizing plate in order from an incident side of light, the phase difference that has been generated due to the pretilt angle is compensated for. Note that the optical compensation elements may be arranged so as to be in close contact with the liquid crystal light valve. Then, an image projected from a liquid crystal projector apparatus is displayed with a high contrast, and image quality is improved (see, for example, Japanese Patent Application No. 2008-552175, Japanese Patent Application Laid-Open No. 2006-184872, and Japanese Patent Application Laid-Open No. 2004-046097). Specifically, the phase difference that has been generated due to the pretilt angle is compensated for by using an optical compensation plate obtained by bonding the pair of phase difference layers with the adhesive layer. As a result, an image projected from the liquid crystal projector apparatus can be displayed with a high contrast, and image quality is improved.

CITATION LIST

Patent Document

Patent Document 1: Japanese Patent Application Laid-Open No. 2008-112004
Patent Document 2: Japanese Patent Application No. 2008-552175
Patent Document 3: Japanese Patent Application Laid-Open No. 2006-184872
Patent Document 4: Japanese Patent Application Laid-Open No. 2004-046097

SUMMARY OF THE INVENTION

Problems to be Solved by the Invention

However, in recent years, due to an increase in luminance of liquid crystal projector apparatuses, the sizes of liquid crystal light valves have been reduced, and therefore an amount per unit area of light with which an optical compensation plate is irradiated has tended to increase. In some cases, the temperature of the optical compensation plate becomes approximately 100° C. Furthermore, in a three-plate type liquid crystal projector apparatus, an image is obtained on the basis of image information or an image signal by using red light, green light, and blue light that have been obtained by separating white light from a light source using a dichroic mirror or the like. It is known that ultraviolet rays included in blue light deteriorate an organic material such as an adhesive at this time. Then, there is a possibility that an adhesive layer that has deteriorated due to long-time irradiation with the ultraviolet rays will deteriorate a phase difference layer and this will cause a reduction in transmittance as the entirety of the liquid crystal light valve, a reduction in contrast, and poor image quality. Furthermore, there is also a possibility that the state of the phase difference layer will significantly change before and after the formation of the adhesive layer, and this will cause characteristic variation.

Accordingly, it is an object of the present disclosure to provide an optical compensation element that has a small variation in the phase difference characteristic of a phase difference layer and is capable of maintaining a satisfactory optical compensation characteristic even under an environment of irradiation with strong light, a liquid crystal light valve including the optical compensation element, and a liquid crystal projector apparatus including the liquid crystal light valve.

Solutions to Problems

An optical compensation element according to the present disclosure that is used to achieve the object described above includes:
a first member that includes a first transparent substrate, a first alignment film that is formed on the first transparent substrate, and a first phase difference layer that is formed on the first alignment film; and
a second member that includes a second transparent substrate, a second alignment film that is formed on the second transparent substrate, and a second phase difference layer that is formed on the second alignment film,
a first inorganic barrier layer is formed on a surface of the first phase difference layer, the surface facing the second member,
a second inorganic barrier layer is formed on a surface of the second phase difference layer, the surface facing the first member, and
the first inorganic barrier layer and the second inorganic barrier layer are bonded by an adhesive layer.

A liquid crystal light valve assembly according to the present disclosure that is used to achieve the object described above includes:
a liquid crystal light valve; and
the optical compensation element according to the present disclosure that is disposed on at least one side of the liquid crystal light valve.

A liquid crystal projector apparatus according to the present disclosure that is used to achieve the object described above includes:
a light source;
a liquid crystal light valve assembly that light from the light source enters; and
a projection lens system that projects light that has been emitted from the liquid crystal light valve assembly onto a projection surface, and
the liquid crystal light valve assembly includes the liquid crystal light valve assembly according to the present disclosure.

Effects of the Invention

In a conventional optical compensation plate that has a structure in which a first phase difference layer and a second phase difference layer are stuck together with an adhesive layer, the phase difference characteristic of the optical compensation plate significantly changes due to the deterioration of the adhesive layer, and the reliability of a liquid crystal projector apparatus is reduced. In contrast, according to the present disclosure, an optical compensation element has a structure in which a first inorganic barrier layer and a second inorganic barrier layer are bonded with an adhesive layer. Therefore, the phase difference characteristic of the optical compensation element does not significantly change due to the deterioration of the adhesive layer, a stable phase difference characteristic can be realized, and a satisfactory optical compensation characteristic can be maintained even under an environment of irradiation with strong light. Therefore, the display performance such as a contrast characteristic can be improved in a liquid crystal light valve using the optical compensation element according to the present disclosure, and a highly reliable and maintenance-free liquid crystal projector apparatus can be provided. Note that effects described herein are only illustrative and are not restrictive, and additional effects may be exhibited.

MODE FOR CARRYING OUT THE INVENTION

The present disclosure will be described below on the basis of examples with reference to the drawings; however, the present disclosure is not limited to the examples, and various numerical values and materials in the examples are illustrative. Note that description will be given in the order described below.

1. General description of optical compensation element, liquid crystal light valve assembly, and liquid crystal projector apparatus according to the present disclosure 2. Example 1 (optical compensation element according to the present disclosure and liquid crystal light valve assembly according to the present disclosure)

3. Example 2 (liquid crystal projector apparatus according to the present disclosure)

4. Others

<General Description of Optical Compensation Element, Liquid Crystal Light Valve Assembly, and Liquid Crystal Projector Apparatus According to the Present Disclosure>

A liquid crystal projector apparatus according to the present disclosure further includes:

a plurality of liquid crystal light valve assemblies;

a first optical system that splits light from a light source into a plurality of optical paths; and a second optical system that couples rays of light from the plurality of liquid crystal light valve assemblies to a single optical path and emits the rays of light from the plurality of liquid crystal light valve assemblies to a projection lens system, each of the plurality of liquid crystal light valve assemblies is arranged in each of the plurality of optical paths slit by the first optical system, and at least one of the plurality of liquid crystal light valve assemblies can include a liquid crystal light valve assembly according to the present disclosure.

A liquid crystal light valve according to the present disclosure or a liquid crystal light valve that configures the liquid crystal projector apparatus according to the present disclosure including the preferred embodiment described above (hereinafter "referred to as a "liquid crystal light valve according to the present disclosure, or the like"") includes a first polarizing plate, a first substrate, a liquid crystal layer, a second substrate, and a second polarizing plate, and an optical compensation element can be disposed between the first polarizing plate and the first substrate, between the second substrate and the second polarizing plate, or between the first polarizing plate and the first substrate and between the second substrate and the second polarizing plate.

Figure 9:
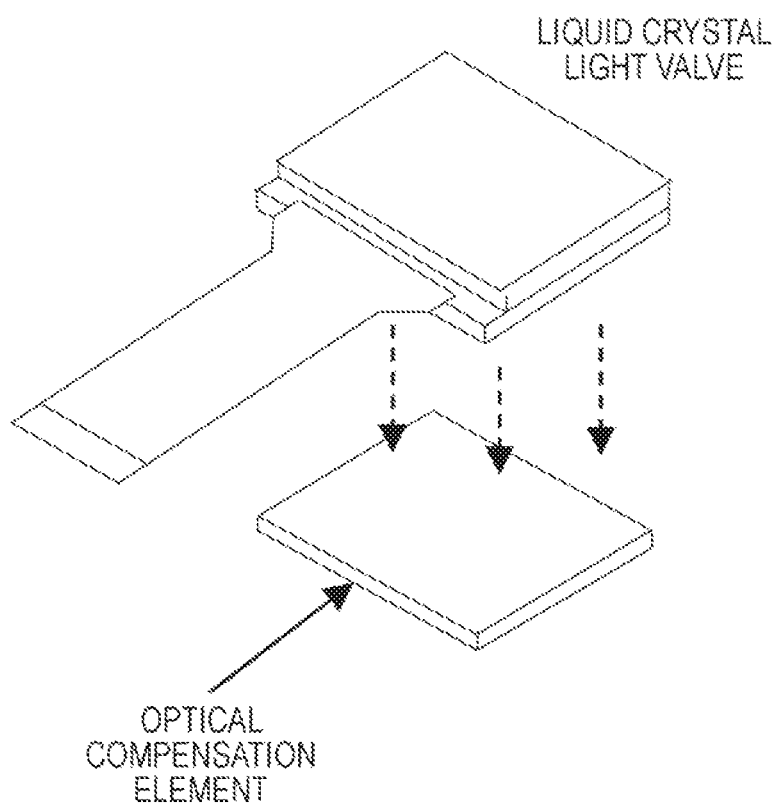
FIG. 9 is an exploded perspective view of the liquid crystal light valve assembly in Example 1.

Alternatively, in a liquid crystal light valve assembly according to the present disclosure, or the like including the preferred embodiment described above, a liquid crystal light valve includes a dust-proof glass, and an optical compensation element can also be used as the dust-proof glass. In general, in a liquid crystal light valve assembly or the like, a dust-proof glass is included in a first substrate and a second substrate of a liquid crystal light valve in order to prevent the liquid crystal light valve from being damaged and prevent dust from adhering to the liquid crystal light valve. Specifically, the dust-proof glass is stuck on each of an outer surface of the first substrate and an outer surface of the second substrate in the liquid crystal light valve. By configuring at least one of these dust-proof glasses using an optical compensation element, the liquid crystal light valve and the optical compensation element can be integrated, as illustrated in FIG. 9. In other words, without separate arrangement, the saving of a space for the liquid crystal projector apparatus can be achieved, and a cost can be reduced. In a case where the optical compensation element is disposed between the first substrate and the first polarizing plate, the optical compensation element can be substituted for the dust-proof glass stuck to the first substrate, and in a case where the optical compensation element is disposed between the second substrate and the second polarizing plate, the optical compensation element can be substituted for the dust-proof glass stuck to the second substrate. Alternatively, the optical compensation element can be substituted for the first substrate, and the optical compensation element can be substituted for the second substrate.

Moreover, in the liquid crystal light valve assembly according to the present disclosure, or the like including the various preferred embodiments described above, liquid crystal molecules that configure the liquid crystal layer can have a pretilt state. In other words, the liquid crystal light valve is a vertical alignment (VA) mode transmission type liquid crystal light valve, and the liquid crystal molecules that configure the liquid crystal layer can have the pretilt state. However, the operation mode of the liquid crystal light valve is not limited to the vertical alignment mode, and can be, for example, a TN mode.

In the optical compensation element that configures the liquid crystal light valve assembly according to the present disclosure, or the like including the various preferred embodiments described above or the optical compensation element according to the present disclosure (hereinafter, in some cases, these optical compensation elements are collectively referred to as an "optical compensation element according to the present disclosure, or the like"), a first phase difference layer and a second phase difference layer can include a polymerizable liquid crystal composition. Examples of the alignment mode of the polymerizable liquid crystal composition include hybrid alignment and splay alignment. Examples of a material that configures the first phase difference layer and the second phase difference layer include a thermosetting liquid crystal polymer material and a photocurable liquid crystal polymer material, and specifically, examples of the liquid crystal polymer material include a nematic liquid crystal material and a discotic liquid crystal material. The birefringences of these liquid crystal polymer materials may be positive or negative.

In the optical compensation element according to the present disclosure, or the like including the preferred embodiment described above, a configuration can be employed in which a first inorganic barrier layer is formed on part of a surface that faces a second member of the first phase difference layer. Alternatively, a configuration can be employed in which the first inorganic barrier layer is formed on the entirety of the surface that faces the second member of the first phase difference layer, and in this case, a configuration can be employed in which the first inorganic barrier layer is also formed on a side surface of the first phase difference layer.

In the optical compensation element according to the present disclosure, or the like including the various preferred embodiments described above, a configuration can be employed in which a second inorganic barrier layer is formed on part of a surface that faces a first member of the second phase difference layer. Alternatively, a configuration can be employed in which the second inorganic barrier layer is formed in the entirety of the surface that faces the first member of the second phase difference layer, and in this case, a configuration can be employed in which the second inorganic barrier layer is also formed on a side surface of the second phase difference layer.

In some cases, the first phase difference layer and the second phase difference layer start to deteriorate from ends that are in contact with the air, and image quality deteriorates from a peripheral portion. However, by employing a configuration in which the first inorganic barrier layer is also formed on the side surface of the first phase difference layer and the second inorganic barrier layer is also formed on the side surface of the second phase difference layer, the first inorganic barrier layer and the second inorganic barrier layer can be suppressed from deteriorating from the ends, and high image quality can be maintained. The ends of the first phase difference layer, the ends of the adhesive layer, and the ends of the second phase difference layer may be covered with a sealing member. Alternatively, part of the first inorganic barrier layer that is formed on the side surface of the first phase difference layer, the ends of the adhesive layer, and part of the second inorganic barrier layer that is formed on the side surface of the second phase difference layer may be covered with the sealing member.

In the optical compensation element according to the present disclosure, or the like including the various preferred embodiments and configurations described above, the first inorganic barrier layer is formed using, for example, $SiO_2$, SiN, SiON, or $Nb_2O_5$. Alternatively, when a thickness direction of the first inorganic barrier layer is a $Z_1$-axis, two axes that are orthogonal to the $Z_1$-axis and are orthogonal to each other are an $X_1$-axis and a $Y_1$-axis, a refractive index of the first inorganic barrier layer along the $Z_1$-axis is $n_{1-Z}$, a refractive index of the first inorganic barrier layer along the $X_1$-axis is $n_{1-X}$, and a refractive index of the first inorganic barrier layer along the $Y_1$-axis is $n_{1-Y}$, the first inorganic barrier layer can satisfy $n_{1-X}=n_{1-Y}>n_{1-Z}$. In other words, a negative C-plate can be configured by the first inorganic barrier layer. Then, in this case, the first inorganic barrier layer can be formed by laminating a plurality of $SiO_2$ layers (a refractive index: 1.46) and a plurality of SiN layers (a refractive index: 1.90), or can be formed by laminating a plurality of $SiO_2$ layers (a refractive index: 1.46) and a plurality of $Nb_2O_5$ layers (a refractive index: 2.32). By configuring the negative C-plate using the first inorganic barrier layer, a high contrast can be achieved, and an inexpensive optical compensation element using an efficient process can be provided.

Moreover, in the optical compensation element according to the present disclosure, or the like including the various preferred embodiments and configurations described above, the second inorganic barrier layer is formed using, for example, $SiO_2$, SiN, SiON, or $Nb_2O_5$. Alternatively, when a thickness direction of the second inorganic barrier layer is a $Z_2$-axis, two axes that are orthogonal to the $Z_2$-axis and are orthogonal to each other are an $X_2$-axis and a $Y_2$-axis, a refractive index of the second inorganic barrier layer along the $Z_2$-axis is $n_{2-Z}$, a refractive index of the second inorganic barrier layer along the $X_2$-axis is $n_{2-X}$, and a refractive index of the second inorganic barrier layer along the $Y_2$-axis is $n_{2-Y}$, the second inorganic barrier layer can satisfy $n_{2-X}=n_{2-Y}>n_{2-Z}$. In other words, a negative C-plate can be configured by the second inorganic barrier layer. Then, in this case, the second inorganic barrier layer can be formed by laminating a plurality of $SiO_2$ layers and a plurality of SiN layers, or can be formed by laminating a plurality of $SiO_2$ layers and a plurality of $Nb_2O_5$ layers. By configuring the negative C-plate using the second inorganic barrier layer, a high contrast can be achieved, and an inexpensive optical compensation element using an efficient process can be provided.

Examples of a method for forming the first inorganic barrier layer and the second inorganic barrier layer include sputtering, CVD, and ALD.

Moreover, in the optical compensation element according to the present disclosure, or the like including the various preferred embodiments and configurations described above, an angle formed by an optical axis of a first alignment film and an optical axis of a second alignment film can be approximately 90 degrees. Specifically, examples of the angle formed by the optical axis of the first alignment film and the optical axis of the second alignment film include 90 degrees±10 degrees.

The first alignment film and the second alignment film are formed using an inorganic material such as $SiO_2$, and can be formed according to vacuum deposition or the like. Alternatively, the first alignment film and the second alignment film are formed using a photocurable alignment material on which optical alignment treatment has been performed, or can be formed by performing rubbing treatment on polyimide-based resin. An organic material that configures the first alignment film and the second alignment film can be formed into a film according to spin coating, a printing method, an ink jet method, or the like.

In the optical compensation element according to the present disclosure, or the like including the various preferred embodiments and configurations described above, the phase difference of each of the phase difference layers is set in such a way that a desired optical compensation characteristic can be obtained. In a case where the liquid crystal light valve operates, for example, in the vertical alignment (VA) mode, a phase difference with respect to light that enters at an incident angle (a polar angle) of 0 degrees with respect to a normal direction of the optical compensation element also depends on a pretilt angle of liquid crystal molecules. However, it is preferable that the phase difference be set to be about 50 nm or less and preferably, about 10 nm or less. The film thickness of the phase difference layer may be appropriately determined according to a material that configures the phase difference layer.

The phase difference may be set for each liquid crystal light valve in such a way that an optimal viewing angle characteristic can be obtained depending on a wavelength range of light that enters each of the liquid crystal light valves.

Moreover, it is preferable that a difference between a refractive index of a material that configures the first phase difference layer and a refractive index of a material that configures the first inorganic barrier layer in the thickness direction be less than or equal to 0.1, and it is preferable that a difference between the refractive index of the material that configures the first inorganic barrier layer and a refractive index of a material that configures the adhesive layer in the thickness direction be less than or equal to 0.1. Similarly, it is preferable that a difference between a refractive index of a material that configures the second phase difference layer and a refractive index of a material that configures the second inorganic barrier layer in the thickness direction be less than or equal to 0.1, and it is preferable that a difference between the refractive index of the material that configures the second inorganic barrier layer and the refractive index of the material that configures the adhesive layer in the thickness direction be less than or equal to 0.1. By setting the differences in the refractive index to have the values described above, adverse effects on the optical characteristics of the optical compensation element that are generated by the reflection of light on an interface can be suppressed. For example, a refractive index of $SiO_2$ is 1.46, a refractive index of a liquid crystal polymer material that configures the first phase difference layer and the second phase difference layer is around 1.5, and a refractive index of ultraviolet-curable resin that configures the adhesive layer is around 1.5.

Examples of a material that configures a first transparent substrate and a second transparent substrate include white plate glass, blue plate glass, quartz glass, alkali-free glass, sapphire glass, and a quartz substrate. It is preferable that the thicknesses of the first transparent substrate and the second transparent substrate is greater than or equal to 0.1 mm, and it is referable that the thicknesses of the first transparent substrate and the second transparent substrate range from 0.2 mm to 2 mm from the viewpoint of the handleability of incorporation and mechanical strength. The first transparent substrate and the second transparent substrate can be configured using a transparent insulating substrate. The first substrate (a counter substrate) of the liquid crystal light valve can be configured by the first transparent substrate and the second transparent substrate, and the second substrate (a TFT substrate) of the liquid crystal light valve can be configured by the first transparent substrate and the second transparent substrate. A microlens array may be disposed on a side of the first substrate. The microlens array can be configured using, for example, a substrate and a microlens array unit that is provided in the substrate.

Examples of the adhesive layer include an adhesive containing ultraviolet-curable acrylic resin as a principal component, an adhesive containing ultraviolet-curable epoxy-based resin as a principal component, an adhesive containing phenolic resin as a principal component, and an adhesive that is formed using an amine-based material, a carboxylic acid-based material, or an acid anhydride-based material that is thermosetting. Note that, if a material that configures the phase difference layer is an acrylic material, it is preferable that the acrylic material be also selected as a material that configures the adhesive layer.

Example 1

Figure 1A:
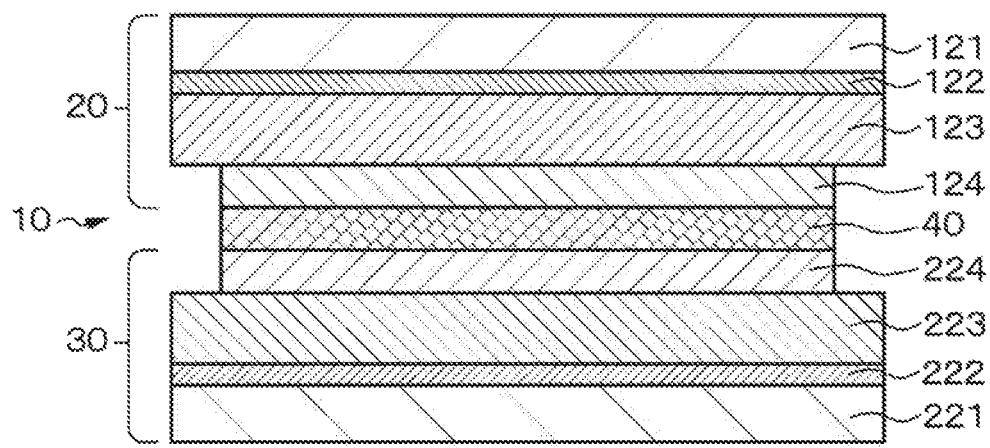
FIGS. 1A, 1B, and 1C are schematic sectional views of an optical compensation element in Example 1.
Figure 1B:
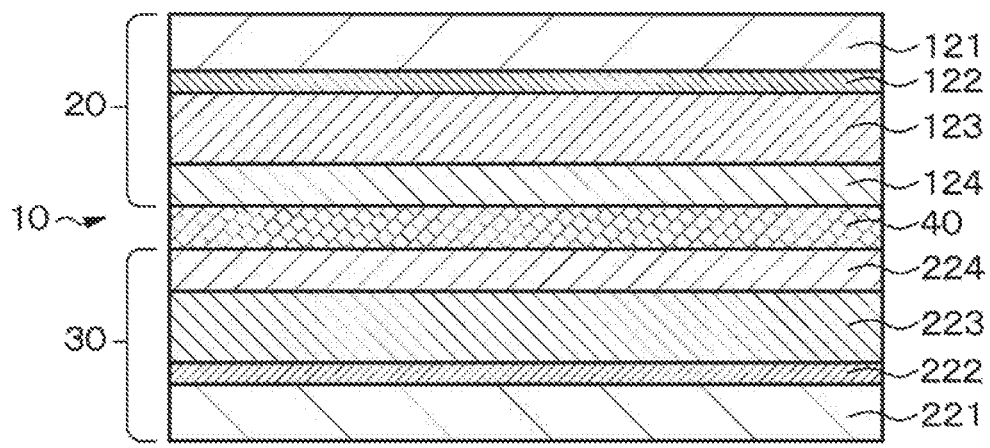
Figure 1C:
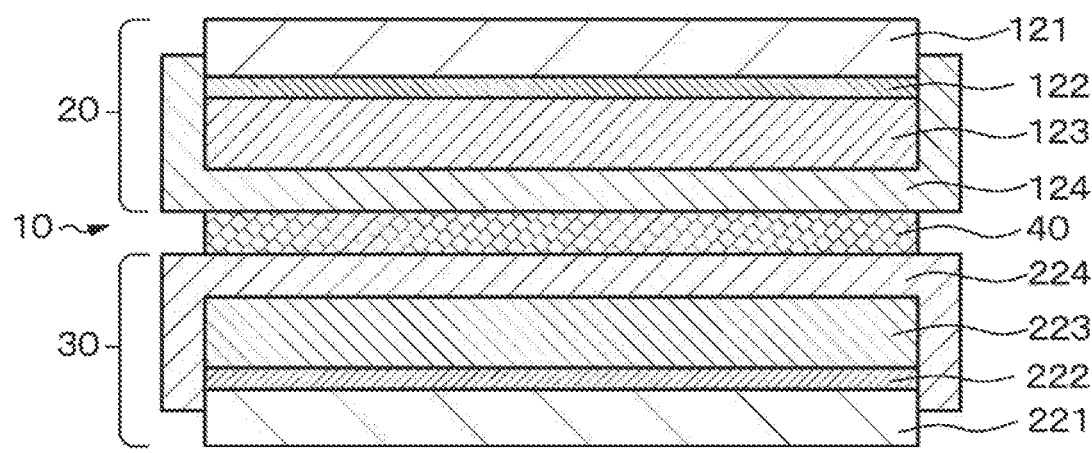

Example 1 relates to the optical compensation element and the liquid crystal light valve according to the present disclosure. FIGS. 1A, 1B, and 1C are schematic sectional views of the optical compensation element according to the present disclosure, FIG. 2 is a conceptual diagram of a liquid crystal light valve in Example 1, and FIG. 9 is an exploded perspective view of a liquid crystal light valve assembly in Example 1.

An optical compensation element 10 in Example 1 includes: a first member 20 that includes a first transparent substrate 121, a first alignment film 122 that is formed on the first transparent substrate 121, and a first phase difference layer 123 that is formed on the first alignment film 122; and a second member 30 that includes a second transparent substrate 221, a second alignment film 222 that is formed on the second transparent substrate 221, and a second phase difference layer 223 that is formed on the second alignment film 222, a first inorganic barrier layer 124 is formed on a surface of the first phase difference layer 123, the surface facing the second member 30, a second inorganic barrier layer 224 is formed on a surface of the second phase difference layer 223, the surface facing the first member 20, and the first inorganic barrier layer 124 and the second inorganic barrier layer 224 are bonded by an adhesive layer 40.

Figure 2:
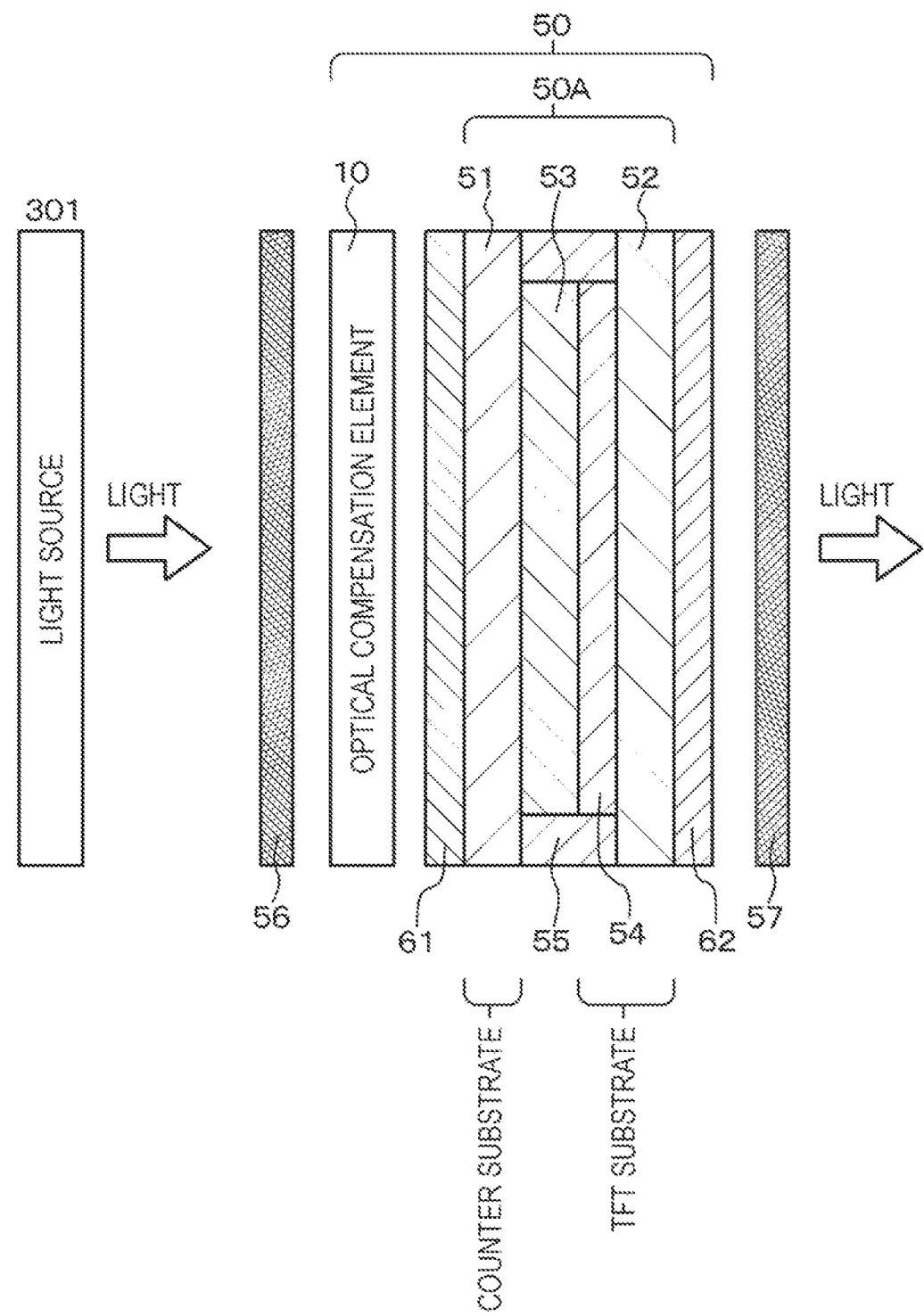
FIG. 2 is a conceptual diagram of a liquid crystal light valve assembly in Example 1.
Figure 3:
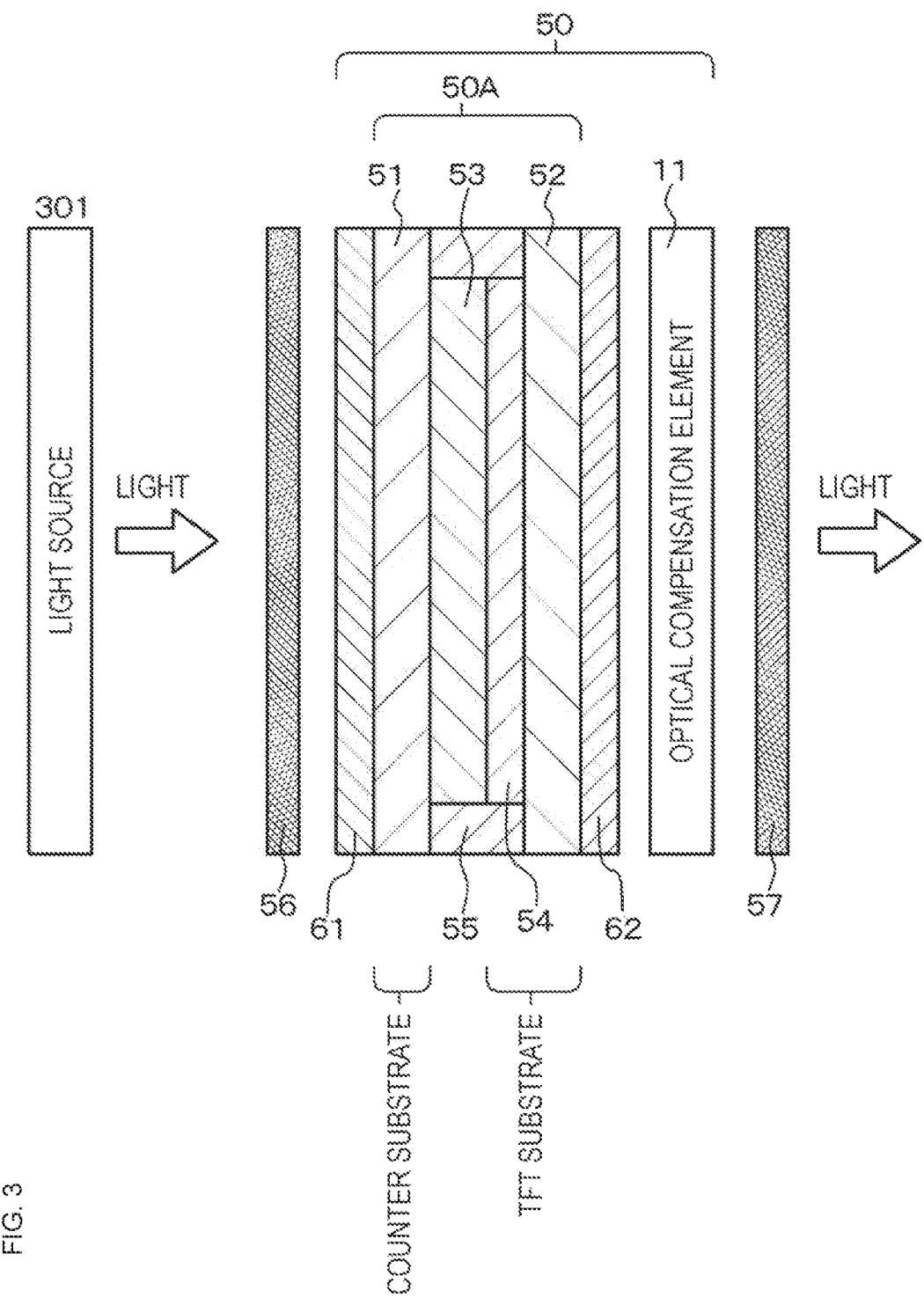
FIG. 3 is a conceptual diagram of a variation of the liquid crystal light valve assembly in Example 1.
Figure 4:
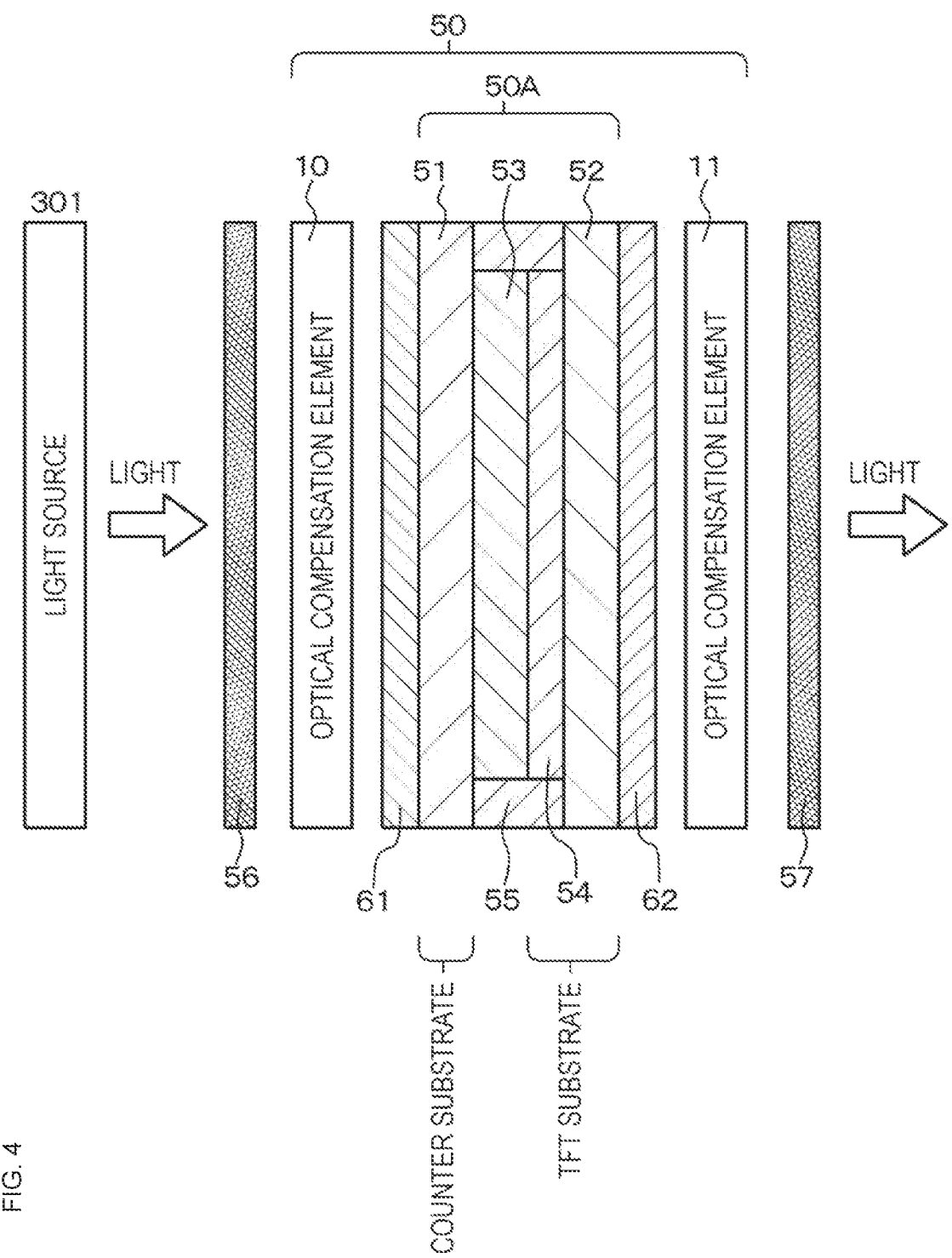
FIG. 4 is a conceptual diagram of another variation of the liquid crystal light valve assembly in Example 1.
Figure 5:
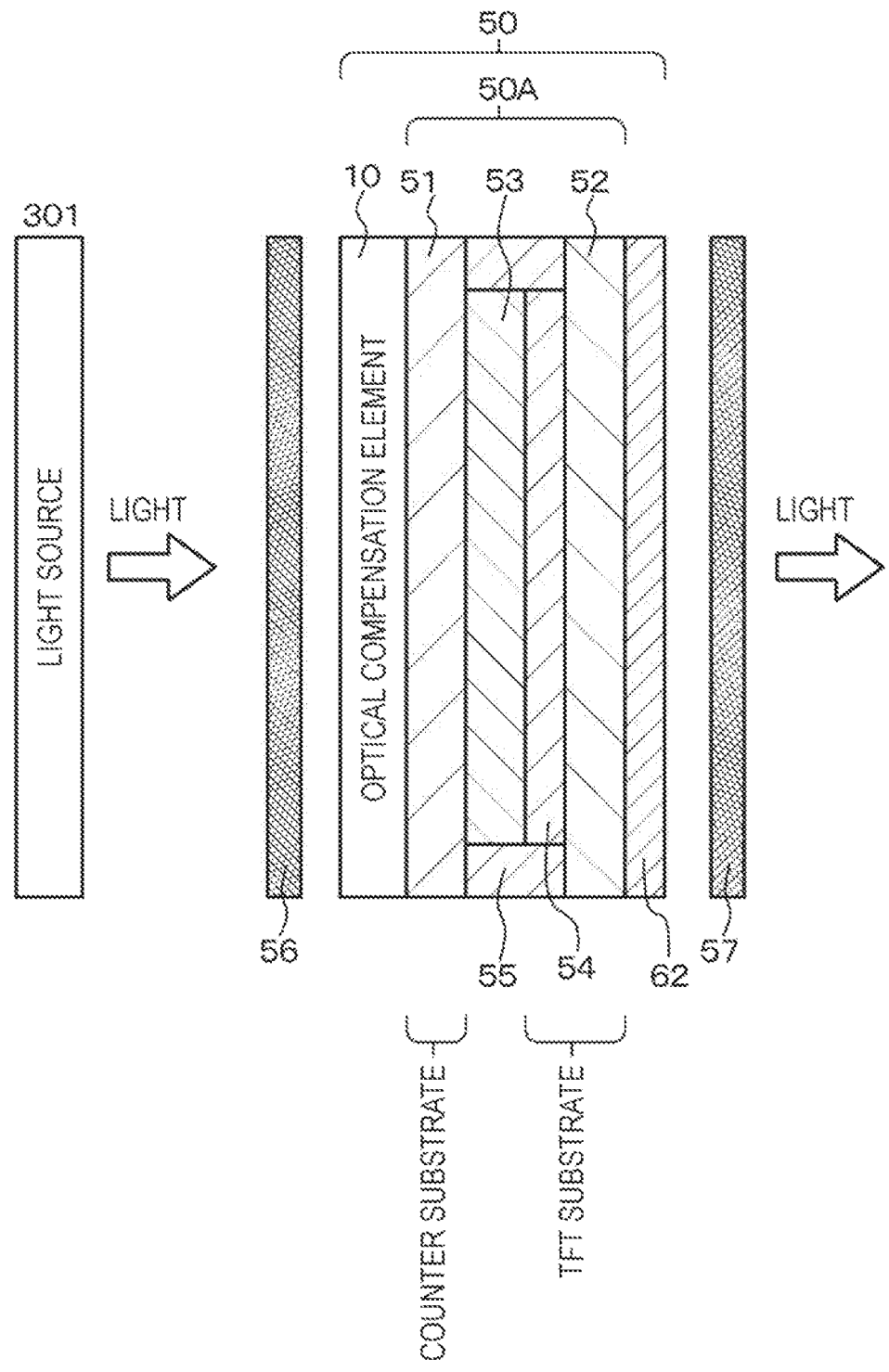
FIG. 5 is a conceptual diagram of another variation of the liquid crystal light valve assembly in Example 1.
Figure 6:
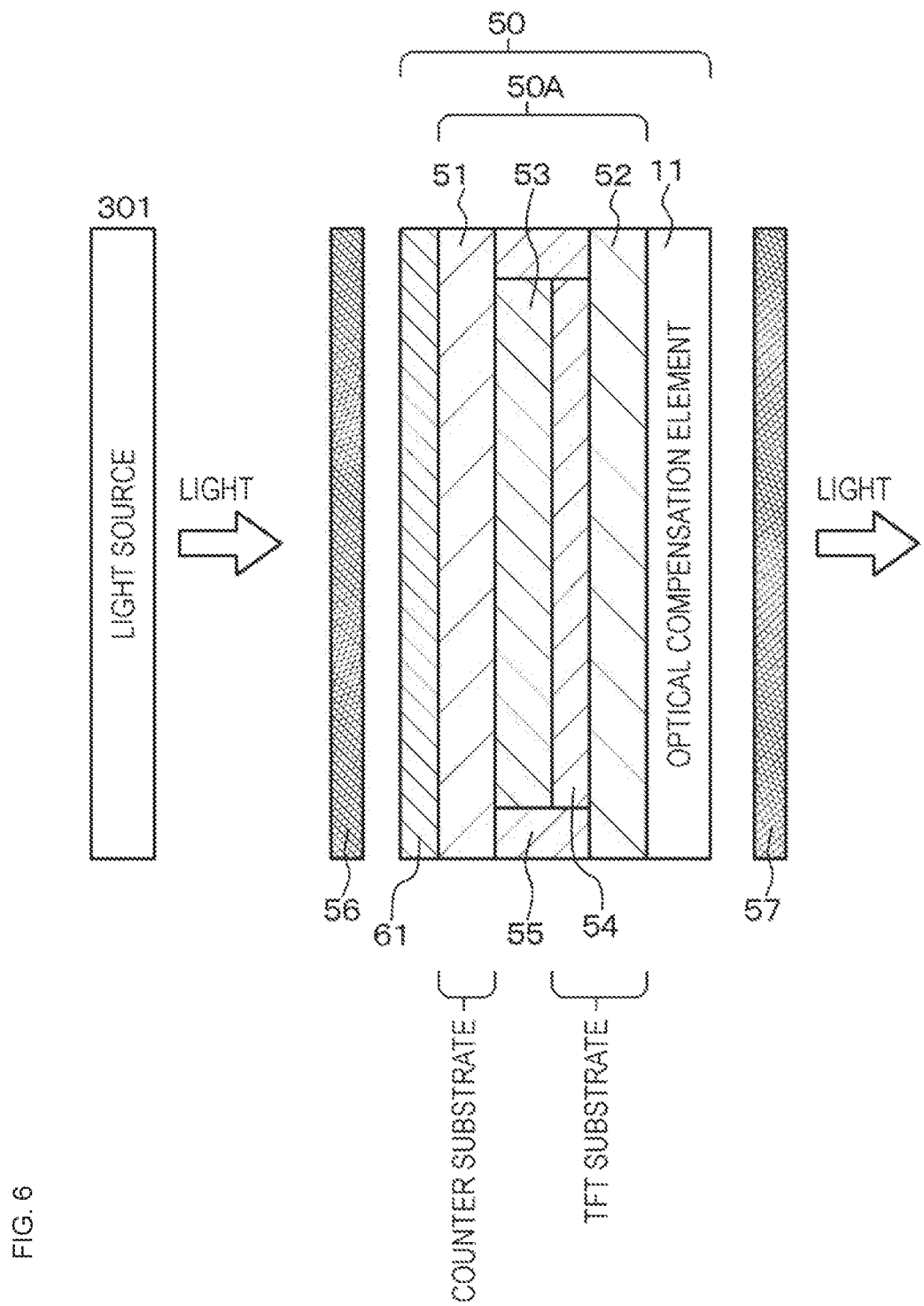
FIG. 6 is a conceptual diagram of another variation of the liquid crystal light valve assembly in Example 1.
Figure 7:
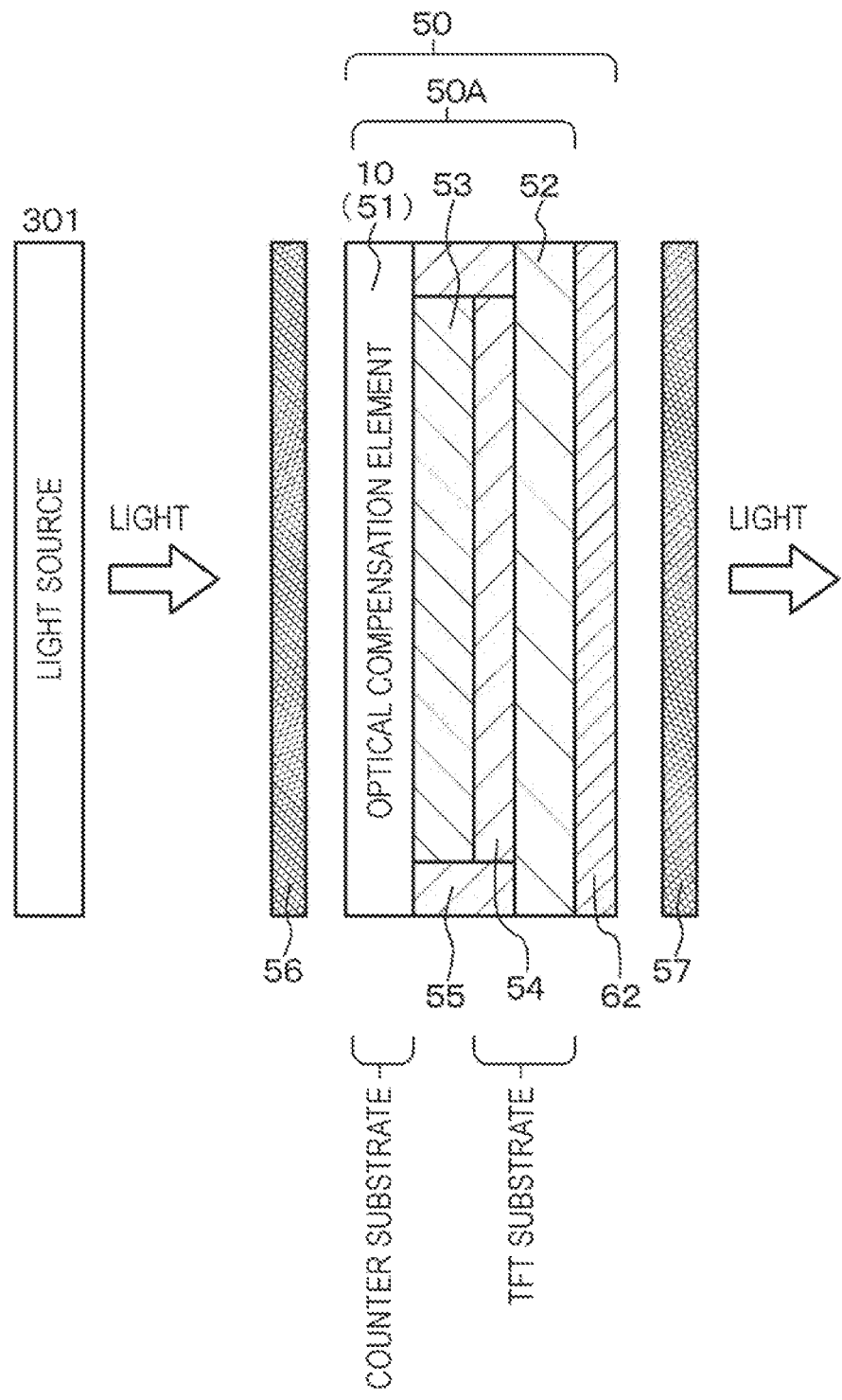
FIG. 7 is a conceptual diagram of another variation of the liquid crystal light valve assembly in Example 1.
Figure 8:
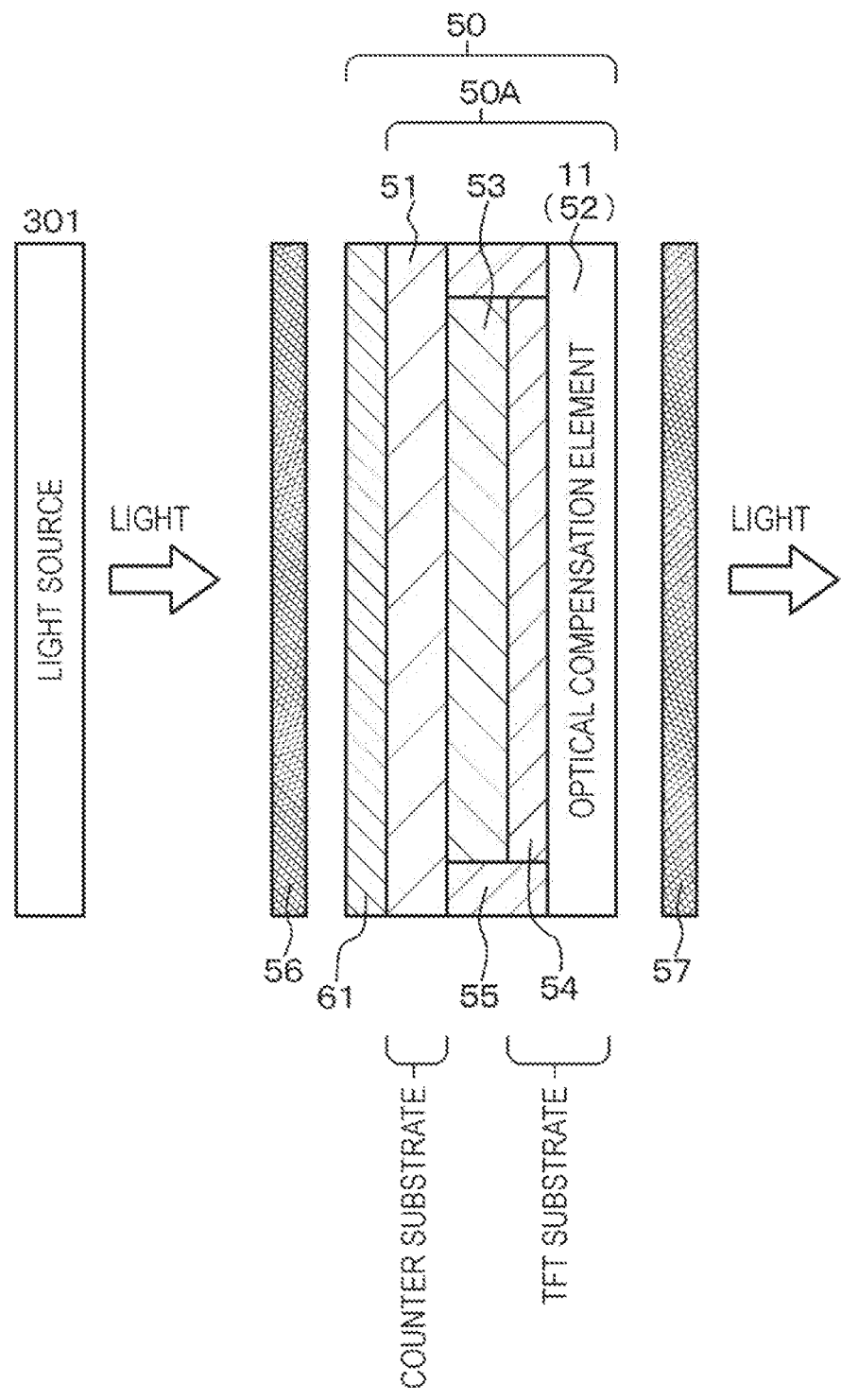
FIG. 8 is a conceptual diagram of another variation of the liquid crystal light valve assembly in Example 1.

Furthermore, a liquid crystal light valve assembly 50 in Example 1, for which a schematic sectional view is illustrated in FIG. 2, includes a liquid crystal light valve (a spatial light modulator) 50A and the optical compensation element 10 in Example 1 that is disposed on at least one side of the liquid crystal light valve 50A (in Example 1, a light-incident side of the liquid crystal light valve 50A). Here, the liquid crystal light valve 50A of a transmission type in Example 1 includes a first polarizing plate 56, a first substrate 51, a liquid crystal layer 53, a second substrate 52, and a second polarizing plate 57, and light enters the first substrate 51 via the first polarizing plate 56. The first substrate 51 is also referred to as a counter substrate, and the second substrate 52 is also referred to as a TFT substrate. The liquid crystal layer 53 is sandwiched by the first substrate 51 and the second substrate 52. On a side of the liquid crystal layer of the second substrate 52, a thin-film transistor (TFT) that drives the liquid crystal layer 53, and the like are formed. In FIG. 2, the TFT and the like are illustrated as a TFT layer 54. The first substrate 51 and the second substrate 52 are sealed by a sealing member 55 in the peripheral portion. The optical compensation element 10 and the first substrate 51 that configures the liquid crystal light valve 50A are arranged so as to be spaced apart from each other. In other words, the optical compensation element 10 is provided independently from the liquid crystal light valve 50A. Dust-proof glasses 61 and 62 are respectively stuck on an outer surface of the first substrate 51 and an outer surface of the second substrate 52 in the liquid crystal light valve 50A.

As described above, the optical compensation element 10 is disposed on the light-incident side of the first substrate 51. However, the optical compensation element 10 in Example 1 may be disposed on both the light-incident side and a light-emitting side of the liquid crystal light valve 50A, and in this case, the optical compensation element 10 is disposed between the first polarizing plate 56 and the first substrate 51 and between the second substrate 52 and the second polarizing plate 57. Alternatively, the optical compensation element 10 in Example 1 may be disposed on the light-emitting side of the liquid crystal light valve 50A, and in this case, the optical compensation element 10 is disposed between the second substrate 52 and the second polarizing plate 57. Light that enters the optical compensation element 10 passes through the first polarizing plate 56, so that the light enters into a linearly polarized state. Then, the second polarizing plate 57 is disposed so as to have a crossed Nichol relationship with respect to the linearly polarized state of the light that enters the optical compensation element 10. The liquid crystal light valve 50A is configured using a well-known vertical alignment (VA) mode liquid crystal light valve that is similar to a liquid crystal display. Liquid crystal molecules that configure the liquid crystal layer 53 are in a pretilt state.

In the optical compensation element 10, the first phase difference layer 123 and the second phase difference layer 223 include a polymerizable liquid crystal composition and specifically, for example, a photocurable liquid crystal polymer material. The polymerizable liquid crystal composition has hybrid alignment. However, the present disclosure is not limited to this, and the polymerizable liquid crystal composition may have, for example, splay alignment.

Furthermore, in Example 1, as illustrated in FIG. 1A, the first inorganic barrier layer 124 is formed on part of a surface that faces the second member 30 of the first phase difference layer 123, and the second inorganic barrier layer 224 is formed on part of a surface that faces the first member 20 of the second phase difference layer 223. In other words, the inorganic barrier layers 124 and 224 are not formed in a peripheral portion of the optical compensation element 10. Here, the peripheral portion refers to a region that does not affect image display and a region outside a light transmission region in the optical compensation element 10.

Alternatively, as illustrated in FIG. 1B, the first inorganic barrier layer 124 is formed in the entirety of the surface that faces the second member 30 of the first phase difference layer 123, and the second inorganic barrier layer 224 is formed in the entirety of the surface that faces the first member 20 of the second phase difference layer 223. Then, in this case, as illustrated in FIG. 1C, the first inorganic barrier layer 124 can also be formed on a side surface of the first phase difference layer 123, and the second inorganic barrier layer 224 can also be formed on a side surface of the second phase difference layer 223.

The first inorganic barrier layer 124 is formed using SiN, and the second inorganic barrier layer 224 is also formed using SiN. Alternatively, the first inorganic barrier layer 124 satisfies $n_{1-X}=n_{1-Y}>n_{1-Z}$. In other words, a negative C-plate is configured by the first inorganic barrier layer 124. Then, the first inorganic barrier layer 124 is formed by laminating a plurality of $SiO_2$ layers and a plurality of SiN layers. Similarly, the second inorganic barrier layer 224 also satisfies $n_{2-X}=n_{2-Y}>n_{2-Z}$. In other words, the negative C-plate is also configured by the second inorganic barrier layer 224. Then, the second inorganic barrier layer 224 is also formed by laminating a plurality of $SiO_2$ layers and a plurality of SiN layers. Moreover, an angle formed by an optical axis of the first alignment film 122 and an optical axis of the second alignment film 222 is approximately 90 degrees.

The optical compensation element 10 can be manufactured according to the method described below.

[Process—100]

First, two transparent substrates 121 and 221 are prepared. Specifically, a quartz substrate having a nominal diagonal of 0.8 inches was used as the first transparent substrate 121 and the second transparent substrate 221. Then, the first transparent substrate 121 and the second transparent substrate 221 were cleaned with pure water, and were dried at 120° C. for 20 minutes. Next, the first alignment film 122 was formed on the first transparent substrate 121, and the second alignment film 222 was formed on the second transparent substrate 221. Specifically, the first alignment film 122 and the second alignment film 222 that have a thickness of 30 nm and are formed using an inorganic material such as $SiO_2$ were formed according to vacuum deposition. Subsequently, the first phase difference layer 123 was formed on the first alignment film 122, and the second phase difference layer 223 was formed on the second alignment film 222. In other words, the first phase difference layer 123 can be obtained by applying the precursor material of the first phase difference layer 123 onto the first alignment film 122 and curing the precursor material, and the second phase difference layer 223 can be obtained by applying the precursor material of the second phase difference layer 223 onto the second alignment film 222 and curing the precursor material. Specifically, the precursor materials of the phase difference layers 123 and 223 that have a thickness of 0.5 μm and are formed using a photocurable liquid crystal polymer material were applied onto the alignment films 122 and 222 according to spin coating, and were dried at 70° C. for 60 seconds. Then, irradiation with ultraviolet rays having a wavelength of 400 nm or less was performed at 10 milliwatts for 50 seconds, post-baking was subsequently performed at 150° C. for 1 hour, and a solvent was dried. By doing this, the phase difference layers 123 and 223 having a film thickness of 0.5 μm could be obtained. Phase differences in a front direction (a direction of a polar angle of 0 degrees) of the phase difference layers 123 and 223 became about 5 nm. Note that the thicknesses of the phase difference layers 123 and 223 or the thickness of the adhesive layer 40 were obtained by performing sampling measurement on 50 samples by using an electron microscope.

[Process—110]

Thereafter, the first inorganic barrier layer 124 was formed on the first phase difference layer 123, and the second inorganic barrier layer 224 was formed on the second phase difference layer 223.

Note that, in a case where the inorganic barrier layers 124 and 224 are partially formed on the phase difference layers 123 and 223, as illustrated in FIG. 1A or in a case where the first inorganic barrier layer 124 is also formed on the side surface of the first phase difference layer 123 and the second inorganic barrier layer 224 is also formed on the side surface of the second phase difference layer 223, as illustrated in FIG. 1C, for example, a mask layer may be provided on portions of the phase difference layers 123 and 223 in which the inorganic barrier layers 124 and 224 will not be formed and the inorganic barrier layers 124 and 224 may be formed, or unnecessary portions of the inorganic barrier layers 124 and 224 may be removed after the inorganic barrier layers 124 and 224 are formed.

[Process—120]

Thereafter, the adhesive layer 40 that is formed using an adhesive containing ultraviolet-curable acrylic resin as a principal component was applied to the first inorganic barrier layer 124 or the second inorganic barrier layer 224. The adhesive layer 40 may be applied to both the first inorganic barrier layer 124 and the second inorganic barrier layer 224. The adhesive layer 40 may be applied in a desired pattern by using a dispenser, or a screen printing method may be employed. Then, the first inorganic barrier layer 124 and the second inorganic barrier layer 224 were made to face each other across the adhesive layer 40, and the first member 20 and the second member 30 were arranged in such a way that an angle formed by the optical axis of the first alignment film 122 and the optical axis of the second alignment film 222 is approximately 90 degrees. Then, the adhesive layer 40 is cured by pressing the first member 20 and the second member 30 to each other and performing light irradiation and heating as needed. Specifically, the adhesive layer 40 was cured by irradiating the adhesive layer 40 with ultraviolet rays having a wavelength of 400 nm or less at an intensity of 10 milliwatts for 50 seconds. The thickness of the adhesive layer 40 was 10 μm. Thus, the first member 20 and the second member 30 were stuck together with the adhesive layer 40, and the optical compensation element 10 was completed. Thereafter, the liquid crystal light valve assembly 50 could be obtained by arranging the optical compensation element 10 between the first polarizing plate 56 and the first substrate 51 that configure the liquid crystal light valve 50A.

In Example 1A, the structure of an optical compensation element is the structure illustrated in FIG. 1B, and in [Process—110], the first phase difference layer 123 and the second inorganic barrier layer 224 that have a thickness of 30 nm and are formed using SiN were formed according to CVD.

In Example 1B, the structure of an optical compensation element is the structure illustrated in FIG. 1C, and in [Process—110], the first phase difference layer 123 and the second inorganic barrier layer 224 that have a thickness of 30 nm and are formed using SiN were formed according to CVD.

In Example 1C, the structure of an optical compensation element is the structure illustrated in FIG. 1B, and in [Process—110], the first phase difference layer 123 and the second inorganic barrier layer 224 that are formed using the negative C-plate were formed according to sputtering. The negative C-plate has a structure in which 70 SiN layers (a refractive index: 1.90) having a thickness of 35 nm and 70 SiO$_2$ layers (a refractive index: 1.46) having a thickness of 35 nm are mutually laminated (the total number of layers: 140 layers). Retardations R$_{th}$ in a thickness direction of the phase difference layers 123 and 223 were 280 nm.

In Comparative Example 1, an optical compensation element was manufactured with [Process—110] omitted.

In Example 1, the liquid crystal light valve 50A includes a transmission type liquid crystal light valve of the vertical alignment mode, and its resolution is XGA, its size is a nominal diagonal of 0.8 inches, and its pixel pitch is 15.6 μm. As the second substrate 52, a high-temperature polysilicon TFT substrate of an active matrix drive system was used. Specific specifications of the liquid crystal layer 53 in the liquid crystal light valve 50A in Example 1 are described in Table 1 below.

TABLE 1

| | |
|---|---|
| Azimuth angle direction (easy-to-align axis) of liquid crystal molecule: | a 45-degree direction with respect to linearly polarized light of light that enters first substrate 51 |
| Polar angle direction (pretilt angle) of liquid crystal molecule: | 5 degrees with respect to normal direction of substrate |
| Thickness of liquid crystal layer: | 3 μm |
| Refractive index anisotropy Δn of liquid crystal molecule: | 0.14 |
| Dielectric constant anisotropy Δε of liquid crystal molecule: | −5.8 |

In liquid crystal light valve assemblies in Example 1A, Example 1B, Example 1C, and Comparative Example 1, an acceleration test was conducted by using an environmental testing machine. Table 2 below indicates results of this, and indicates relative values of light resistance lifetimes in Example 1A, Example 1B, and Example 1C when a light resistance lifetime in Comparative Example 1 is 1. Furthermore, the liquid crystal light valve assemblies in Example 1A, Example 1B, Example 1C, and Comparative Example 1 were incorporated into an optical modulator of the liquid crystal projector apparatus described in Example 2. Note that details will be described in Example 2. Then, a contrast in a central portion of a projection screen was measured.

Table 2 indicates relative values of contrast improvement rates in Example 1A, Example 1B, and Example 1C when a contrast improvement rate in Comparative Example 1 is 1.0.

TABLE 2

| | Light resistance lifetime (relative value) | Contrast improvement rate (relative value) |
|---|---|---|
| Example 1A | 1.3 | 1.0 |
| Example 1B | 1.4 | 1.0 |
| Example 1C | 1.3 | 1.3 |
| Comparative Example 1 | 1.0 | 1.0 |

In Example 1A, Example 1B, and Example 1C, the light resistance lifetime was significantly improved in comparison with Comparative Example 1. In particular, in Example 1B, the structure illustrated in FIG. 1C was employed, and therefore a further longer light resistance lifetime was exhibited. Furthermore, in Example 1A and Example 1B, the contrast improvement rate was equal to a contrast improvement rate in Comparative Example 1. In other words, the inorganic barrier layers did not adversely affect the contrast. Moreover, in Example 1C, the first phase difference layer 123 and the second inorganic barrier layer 224 were configured using the negative C-plate, and therefore the contrast improvement rate was significantly improved.

In a case where a liquid crystal light valve is a vertical alignment (VA) mode liquid crystal light valve and liquid crystal molecules that configure a liquid crystal layer have a pretilt state, a reduction in contrast due to light leakage that is generated by the birefringence of the liquid crystal molecules is optically compensated for, as described below.

<A> Optical Compensation for Light Leakage that is Generated by Occurrence of Phase Difference in Front Direction Due to Pretilt Angle of Liquid Crystal Molecules In a vertical alignment mode liquid crystal light valve, a pretilt angle of several degrees is imparted to liquid crystal molecules in order to perform alignment control. Here, in a case where the liquid crystal molecules are considered to be a refractive index ellipsoid having a uniaxial crystal, if the alignment state of the liquid crystal molecules is a vertical alignment state, the polarized state of light that enters from the front direction matches an optical axis direction of the liquid crystal molecules, and therefore a phase difference is not generated in light that has passed through the liquid crystal molecules. In other words, a front phase difference is 0 (zero). However, in a case where the pretilt angle has been imparted to the liquid crystal molecules, due to the occurrence of the front phase difference, the polarized state of the light that enters from the front direction becomes an elliptically polarized state after the light passes through the liquid crystal molecules, and part of light to be originally shielded by the second polarizing plate passes. Light leakage described above is one of the factors of the deterioration of contrast. This factor of a reduction in contrast can be compensated for, for example, by a phase difference layer having hybrid alignment or the like.

<B> Optical Compensation for Light Leakage that is Generated by Light that Obliquely Enters Liquid Crystal Light Valve Light having a linearly polarized state that has entered a liquid crystal light valve from an oblique direction is converted into elliptically polarized light due to the birefringence of liquid crystal molecules, and part of light to be originally shielded by the second polarizing plate passes, similarly to the description above. Light leakage described above is one of the factors of the deterioration of contrast. This factor of a reduction in contrast can be compensated for by arranging an inorganic barrier layer that configures the negative C-plate.

As described above, by employing the optical compensation element according to the present disclosure, a stable phase difference characteristic with a small variation of a phase difference layer can be achieved, a satisfactory optical compensation characteristic of the optical compensation element can be maintained even under an environment of irradiation with strong light, and in the liquid crystal light valve according to the present disclosure using the optical compensation element according to the present disclosure, display performance such as a contrast characteristic can be improved.

It is known that ultraviolet rays of 400 nm or less that are included in blue light deteriorate an organic material. Therefore, in an optical compensation element in which each layer is laminated via an adhesive layer such as epoxy-based resin or acrylic resin, there is a possibility that the adhesive layer will deteriorate due to long-time irradiation with the ultraviolet rays of 400 nm or less, the adhesive layer will deteriorate the phase difference layer, and this will cause a reduction in transmittance as the entirety of the liquid crystal light valve, a reduction in contrast, and poor image quality. In a liquid crystal projector apparatus, for example, when only a liquid crystal light valve for blue light deteriorates, the color balance of the liquid crystal projector apparatus of a three-plate type deteriorates. In the liquid crystal projector apparatus according to the present disclosure, by using the optical compensation element according to the present disclosure, in particular, in a liquid crystal light valve for blue light, a liquid crystal projector apparatus that is capable of maintaining satisfactory characteristics can be provided.

FIG. 3, FIG. 4, FIG. 5, FIG. 6, FIG. 7, and FIG. 8 illustrate variations of the liquid crystal light valve assembly in Example 1. In the liquid crystal light valve assembly illustrated in FIG. 3, an optical compensation element 11 that has a configuration and a structure that are the same as the configuration and structure of the optical compensation element 10 is disposed between the second substrate 52 and the second polarizing plate 57. In the liquid crystal light valve assembly illustrated in FIG. 4, the optical compensation element 10 is disposed between the first polarizing plate 56 and the first substrate 51, and the optical compensation element 11 is disposed between the second substrate 52 and the second polarizing plate 57. In the liquid crystal light valve assembly illustrated in FIG. 5, the optical compensation element 10 is also used as the dust-proof glass 61 in the liquid crystal light valve 50A. In other words, the optical compensation element 10, instead of the dust-proof glass 61, is stuck on an outer surface of the first substrate 51 in the liquid crystal light valve 50A. In the liquid crystal light valve assembly illustrated in FIG. 6, the optical compensation element 11 is also used as the dust-proof glass 62 in the liquid crystal light valve 50A. In other words, the optical compensation element 11, instead of the dust-proof glass 62, is stuck on an outer surface of the second substrate 52 in the liquid crystal light valve 50A. In the liquid crystal light valve assembly illustrated in FIG. 7, the optical compensation element 10 is also used as the first substrate 51 in the liquid crystal light valve 50A. In other words, the second transparent substrate 221 of the optical compensation element 10 is substituted for the first substrate 51. In the liquid crystal light valve assembly illustrated in FIG. 8, the optical compensation element 11 is also used as the second substrate 52 in the liquid crystal light valve 50A. In other words, the first transparent substrate 121 of the optical compensation element 11 is substituted for the second substrate 52.

Example 2

Figure 10:
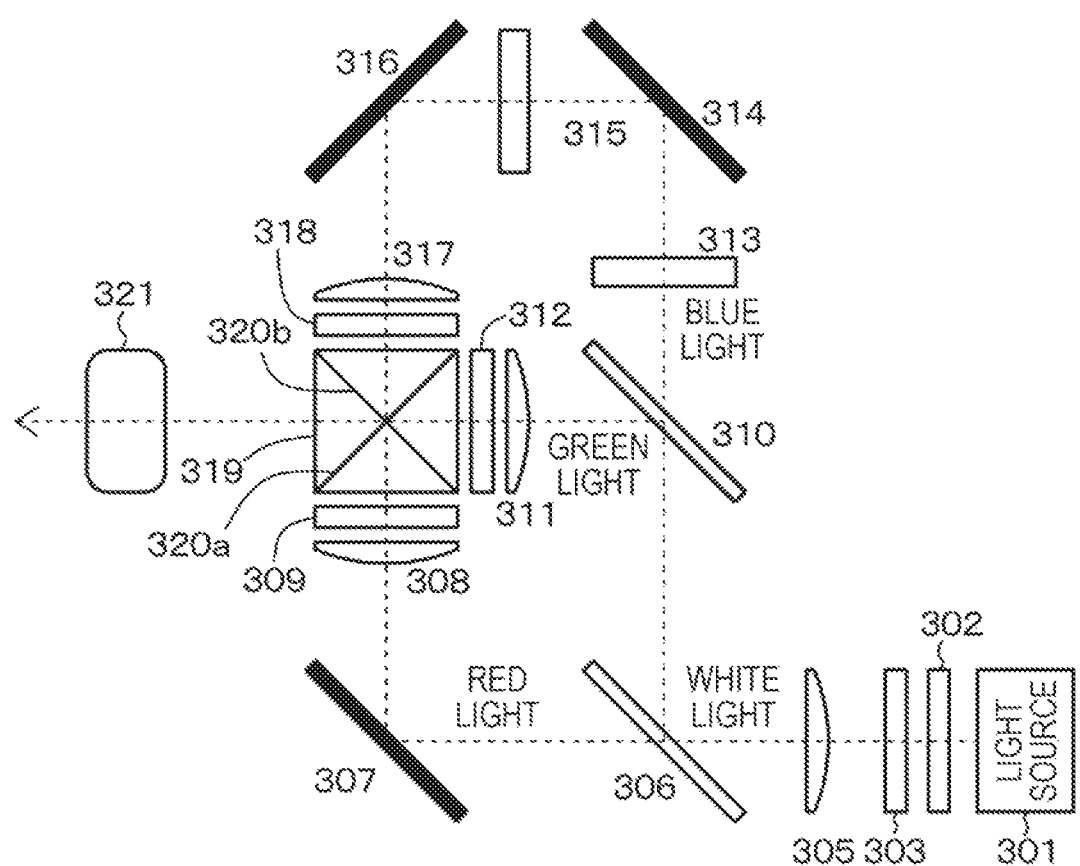
FIG. 10 is a conceptual diagram of a liquid crystal projector apparatus in Example 1.

A liquid crystal projector apparatus 300 of a projection type in Example 2 illustrated in FIG. 10 includes:
a light source 301;
a liquid crystal light valve assembly that light from the light source enters; and
a projection lens system 321 that projects light that has been emitted from the liquid crystal light valve assembly onto a projection surface, and
the liquid crystal light valve assembly includes the liquid crystal light valve assembly 50 described in Example 1.

Moreover, a liquid crystal projector apparatus in Example 2 is, specifically, what is called a three-plate type liquid crystal projector apparatus that separates light from a light source into three primary colors, more specifically, red light, blue light, and green light and that displays a color image by arranging a liquid crystal light valve for light of each of the colors. Then, the liquid crystal projector apparatus 300 in Example 2 further includes:
a plurality of liquid crystal light valve assemblies (optical modulators 309, 312, and 318);
a first optical system (specifically, a dichroic mirror 306) that splits light from the light source 301 into a plurality of optical paths; and
a second optical system (specifically, a cross prism 319) that couples rays of light from the plurality of liquid crystal light valve assemblies (the optical modulators 309, 312, and 318) to a single optical path and emits the rays of light from the plurality of liquid crystal light valve assemblies to a projection lens system 321,
each of the plurality of liquid crystal light valve assemblies (the optical modulators 309, 312, and 318) is arranged in each of the plurality of optical paths split by the first optical system, and
at least one of the plurality of liquid crystal light valve assemblies includes the liquid crystal light valve assembly 50 described in Example 1. Specifically, the optical modulators 309, 312, and 318 include the liquid crystal light valve 50 in Example 1 that includes the optical compensation element 10 described in Example 1.

Alternatively, the liquid crystal projector apparatus 300 in Example 2 is a three-plate type liquid crystal projector apparatus, and includes:
the light source 301;
the first optical system (specifically, the dichroic mirror 306) that splits light from the light source 301 into a plurality of optical paths;
a plurality of liquid crystal light valve assemblies (the optical modulators 309, 312, and 318) that are arranged in the respective plurality of optical paths split by the first optical system;
the second optical system (specifically, the cross prism 319) that couples rays of light from the plurality of liquid crystal light valve assemblies (the optical modulators 309, 312, and 318) to a single optical path; and
the projection lens system 321 that projects light from the second optical system onto a projection surface, and
at least one of the plurality of liquid crystal light valve assemblies includes a liquid crystal light valve 50A and an optical compensation element 10 that is disposed on at least one side of the liquid crystal light valve 50A.

Specifically, the light source 301 is included in the liquid crystal projector apparatus 300, and a not-illustrated cut filter, a first fly-eye lens 302, and a second fly-eye lens 303 are arranged in order on an optical path of light from the light source 301. The light source 301 emits white light that includes red light, green light, and blue light that are three primary colors of light required to project a full-color image. As the light source 301, an ultrahigh-pressure mercury lamp or the like is used, for example, but in recent years, a light-emitting diode or a laser light source has also been used. The cut filter is a plane mirror that reflects and removes light in an ultraviolet wavelength region that is included in the white light emitted from the light source 301. The cut filter is obtained, for example, by forming a reflection layer that reflects light in the ultraviolet wavelength region on a glass substrate, and transmits light in regions other than the ultraviolet wavelength region. The first fly-eye lens 302, together with the second fly-eye lens 303, is provided to change light to a light flux having a shape of the light transmission region of the liquid crystal light valve 50A and to uniformize an illuminance distribution in the light transmission region, in order to uniformly illuminate the light transmission region of the liquid crystal light valve 50A. The first fly-eye lens 302 has a structure in which a plurality of small lens elements is provided in an array, condenses light by using each of the lens elements, and generates a small point light source. Then, light from each of the point light sources is synthesized by the second fly-eye lens 303. The first fly-eye lens 302 and the second fly-eye lens 303 have outer shapes similar to each other that have a ratio approximately equal to an aspect ratio of the light transmission region of the liquid crystal light valve 50A.

A plano-convex lens 305 is arranged on an optical path of light that has passed through the second fly-eye lens 303, condenses light from the second fly-eye lens 303, and efficiently makes the light enter the optical modulators 309, 312, and 318 that include the liquid crystal light valve 50A. The dichroic mirror 306 that only transmits red light is arranged on an optical path of white light that has been emitted from the plano-convex lens 305, and green light and blue light are reflected (split) by the dichroic mirror 306. The dichroic mirrors 306 and 310 are wavelength selective reflectors in which a plurality of dielectric films is laminated on a principal surface of a glass substrate or the like and to which what is called dichroic coating has been applied. A reflector 307 is arranged on an optical path of red light that has passed through the dichroic mirror 306, and a convex-flat lens 308 and the optical modulator 309 are arranged in this order on an optical path of red light reflected by the reflector 307.

On the other hand, the dichroic mirror 310 that transmits blue light and reflects green light is arranged on an optical path of green light and blue light that have been reflected by the dichroic mirror 306. A convex-flat lens 311 and the optical modulator 312 are arranged in this order on an optical path of green light that has been reflected by the dichroic mirror 310. A relay lens 313, a reflector 314, a relay lens 315, a reflector 316, a convex-flat lens 317, and the optical modulator 318 are arranged in this order on an optical path of blue light that has passed through the dichroic mirror 310. The optical modulator 318 that is provided on the optical path of blue light is configured using the liquid crystal light valve assembly 50 in Example 1. The optical modulators 309 and 312 that are provided on the optical path of red light and the optical path of green light are also configured using the liquid crystal light valve assembly 50 in Example 1.

A single cross prism 319 and the projection lens system 321 are arranged in this order on an optical path of red light, green light, and blue light on which optical modulation has been performed by these three optical modulators 309, 312, and 318. The cross prism 319 is formed by cementing, for example, a plurality of glass prisms, and interference filters 320a and 320b having prescribed optical characteristics are formed on a cemented surface of each of the plurality of glass prisms. For example, the interference filter 320a is configured to reflect red light and transmit green light. Furthermore, the interference filter 320b is configured to reflect blue light and transmit green light. Accordingly, red light is reflected in a direction of the projection lens system 321 by the interference filter 320a, and blue light is reflected in the direction of the projection lens system 321 by the interference filter 320b. Furthermore, green light passes through the interference filters 320a and 320b, and reaches the projection lens system 321. Then, red light, green light, and blue light are synthesized on a single optical axis by the projection lens system 321, and are projected onto a projection surface such as a screen.

In the liquid crystal projector apparatus in Example 2, due to a further increase in luminance, an amount of light with which the liquid crystal light valve and the optical compensation element are irradiated is expected to increase. Therefore, the optical compensation element according to the present disclosure or the liquid crystal light valve according to the present disclosure in which the deterioration of an optical compensation characteristic that is caused by the deterioration of the adhesive layer and the deterioration of the phase difference layer is suppressed even under a heated environment due to irradiation with light is particularly effective to make the liquid crystal projector apparatus have a higher contrast and higher quality and make the liquid crystal projector apparatus maintenance-free, and to further make the liquid crystal projector apparatus have a prolonged life and a higher reliability.

Figure 11A:
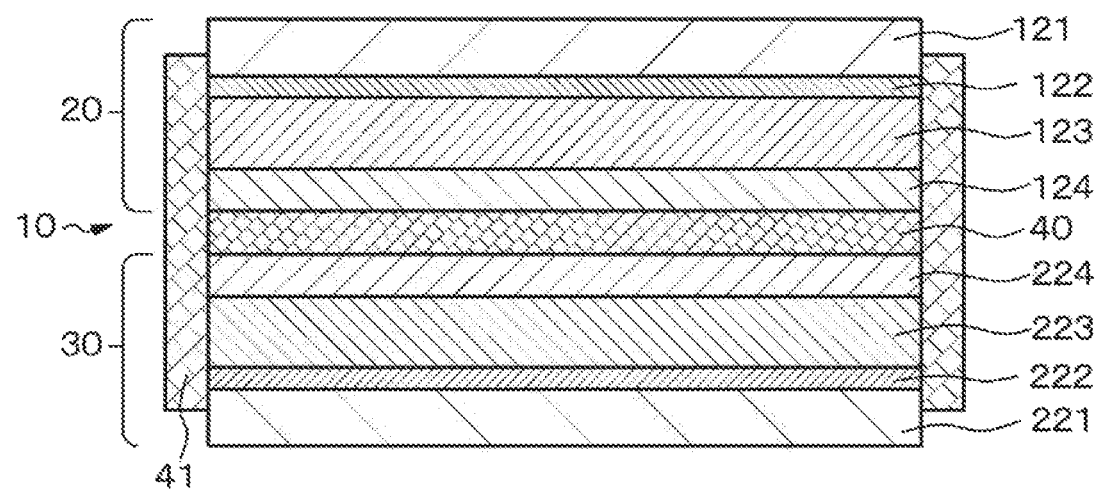
FIGS. 11A and 11B are schematic sectional views of a variation of an optical compensation element according to the present disclosure.
Figure 11B:
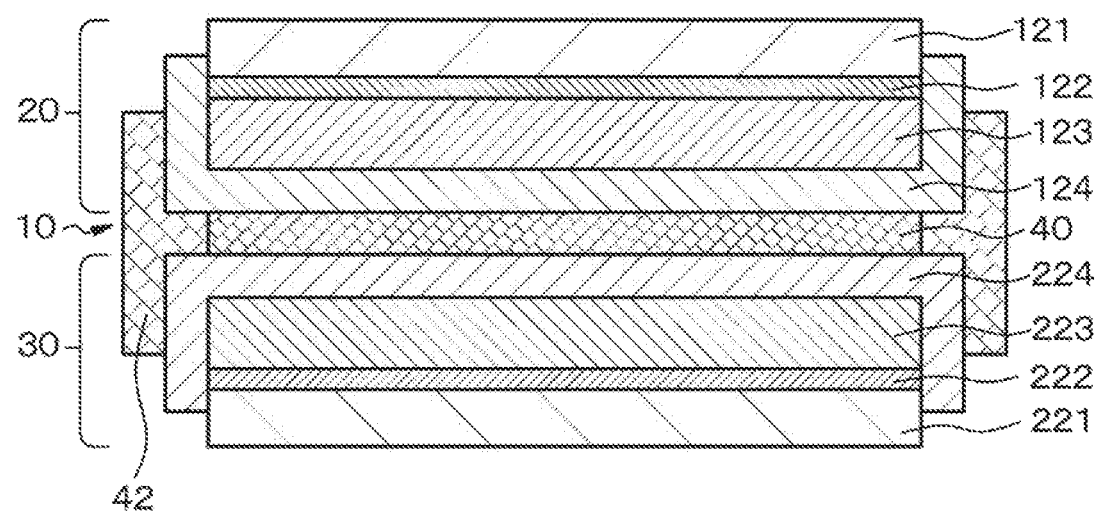

The optical compensation element, the liquid crystal light valve assembly, and the liquid crystal projector apparatus according to the present disclosure have been described above on the basis of preferred examples; however, the configurations and structures of the optical configuration element, the liquid crystal light valve assembly, and the liquid crystal projector apparatus according to the present disclosure are illustrative, and changes can be appropriately made. Furthermore, various materials used in the optical compensation element according to the present disclosure and a manufacturing method and manufacturing conditions of the optical compensation element according to the present disclosure are also illustrative, and changes can be appropriately made. As illustrated in FIG. 11A, ends of the first phase difference layer 123, ends of the adhesive layer 40, and ends of the second phase difference layer 223 may be covered with, for example, a sealing member 41 having light resistance, weather resistance, and a low water permeability. Furthermore, as illustrated in the schematic sectional view of FIG. 11B, part of the first inorganic barrier layer 124 that is formed on the side surface of the first phase difference layer 123, the ends of the adhesive layer 40, and part of the second inorganic barrier layer 224 that is formed on the side surface of the second phase difference layer 223 may be covered with, for example, a sealing member 42 having light resistance, weather resistance, and a low water permeability.

In the examples, description has been given on the basis of a vertical alignment mode liquid crystal light valve; however, an operation mode of the liquid crystal light valve is not limited to the vertical alignment mode, and can be the TN mode or another display mode. Furthermore, a reflection type liquid crystal light valve can also be employed, and similar effects can be obtained. Moreover, the optical compensation element according to the present disclosure can not only be applied to the projection type liquid crystal projector apparatus, but can also be similarly applied to a direct-view type liquid crystal projector apparatus that has a configuration in which rays of light in different wavelength ranges are modulated and synthesized by a plurality of optical modulators including a liquid crystal light valve assembly, and similar effects can be obtained. Furthermore, the liquid crystal projector apparatus is not limited to a three-plate type liquid crystal projector apparatus, and can be a single-plate type liquid crystal projector apparatus.

Note that the present disclosure can also employ the configuration described below.

[A01] <<Optical Compensation Element>>

An optical compensation element including:

a first member that includes a first transparent substrate, a first alignment film that is formed on the first transparent substrate, and a first phase difference layer that is formed on the first alignment film; and a second member that includes a second transparent substrate, a second alignment film that is formed on the second transparent substrate, and a second phase difference layer that is formed on the second alignment film, in which a first inorganic barrier layer is formed on a surface of the first phase difference layer, the surface facing the second member, a second inorganic barrier layer is formed on a surface of the second phase difference layer, the surface facing the first member, and the first inorganic barrier layer and the second inorganic barrier layer are bonded by an adhesive layer.

[A02] The optical compensation element described in [A01], in which the first phase difference layer and the second phase difference layer include a polymerizable liquid crystal composition.

[A03] The optical compensation element described in [A01] or [A02], in which the first inorganic barrier layer is formed on part of the surface of the first phase difference layer, the surface facing the second member.

[A04] The optical compensation element described in [A01] or [A02], in which the first inorganic barrier layer is formed on an entirety of the surface of the first phase difference layer, the surface facing the second member.

[A05] The optical compensation element described in [A04], in which the first inorganic barrier layer is also formed on a side surface of the first phase difference layer.

[A06] The optical compensation element described in any one of [A01] to [A05], in which the second inorganic barrier layer is formed on part of the surface of the second phase difference layer, the surface facing the first member.

[A07] The optical compensation element described in any one of [A01] to [A05], in which the second inorganic barrier layer is formed on an entirety of the surface of the second phase difference layer, the surface facing the first member.

[A08] The optical compensation element described in [A07], in which the second inorganic barrier layer is also formed on a side surface of the second phase difference layer.

[A09] The optical compensation element described in any one of [A01] to [A08], in which when a thickness direction of the first inorganic barrier layer is a $Z_1$-axis, two axes that are orthogonal to the $Z_1$-axis and are orthogonal to each other are an $X_1$-axis and a $Y_1$-axis, a refractive index of the first inorganic barrier layer along the $Z_1$-axis is $n_{1-Z}$, a refractive index of the first inorganic barrier layer along the $X_1$-axis is $n_{1-X}$, and a refractive index of the first inorganic barrier layer along the $Y_1$-axis is $n_{1-Y}$, $$n_{1-X} = n_{1-Y} > n_{1-Z}$$

is satisfied.

[A10] The optical compensation element described in any one of [A01] to [A09], in which the first inorganic barrier layer is formed by laminating a plurality of $SiO_2$ layers and a plurality of SiN layers.

[A11] The optical compensation element described in any one of [A01] to [A10], in which when a thickness direction of the second inorganic barrier layer is a $Z_2$-axis, two axes that are orthogonal to the $Z_2$-axis and are orthogonal to each other are an $X_2$-axis and a $Y_2$-axis, a refractive index of the second inorganic barrier layer along the $Z_2$-axis is $n_{2-Z}$, a refractive index of the second inorganic barrier layer along the $X_2$-axis is $n_{2-X}$, and a refractive index of the second inorganic barrier layer along the $Y_2$-axis is $n_{2-Y}$, $$n_{2-X} = n_{2-Y} > n_{2-Z}$$

is satisfied.

[A12] The optical compensation element described in any one of [A01] to [A11], in which the second inorganic barrier layer is formed by laminating a plurality of $SiO_2$ layers and a plurality of SiN layers.

[A13] The optical compensation element described in any one of [A01] to [A12], in which an angle formed by an optical axis of the first alignment film and an optical axis of the second alignment film is approximately 90 degrees.

[B01] <<Liquid Crystal Light Valve Assembly>>

A liquid crystal light valve assembly including:

a liquid crystal light valve; and the optical compensation element described in any one of [A01] to [A13] that is disposed on at least one side of the liquid crystal light valve.

[B02] The liquid crystal light valve assembly described in [B01], in which the liquid crystal light valve includes a first polarizing plate, a first substrate, a liquid crystal layer, a second substrate, and a second polarizing plate, and the optical compensation element is disposed between the first polarizing plate and the first substrate, between the second substrate and the second polarizing plate, or between the first polarizing plate and the first substrate and between the second substrate and the second polarizing plate.

[B03] The liquid crystal light valve assembly described in [B01] or [B02], in which the liquid crystal light valve includes a dust-proof glass plate, and the optical compensation element is also used as the dust-proof glass plate.

[B04] The liquid crystal light valve assembly described in any one of [B01] to [B03], in which liquid crystal molecules that configure the liquid crystal layer have a pretilt state.

[C01] <<Liquid Crystal Projector Apparatus>>

A liquid crystal projector apparatus including:

a light source;

a liquid crystal light valve assembly that light from the light source enters; and a projection lens system that projects light that has been emitted from the liquid crystal light valve assembly onto a projection surface, in which the liquid crystal light valve assembly includes a liquid crystal light valve and the optical compensation element described in any one of [A01] to [A13] that is disposed on at least one side of the liquid crystal light valve.

[C02] The liquid crystal projector apparatus described in [C01], further including:
　　a plurality of liquid crystal light valve assemblies;
　　a first optical system that splits light from a light source into a plurality of optical paths; and
　　a second optical system that couples rays of light from the plurality of liquid crystal light valve assemblies to a single optical path and emits the rays of light from the plurality of liquid crystal light valve assemblies to the projection lens system,
　　in which each of the plurality of liquid crystal light valve assemblies is arranged in each of the plurality of optical paths split by the first optical system, and
　　at least one of the plurality of liquid crystal light valve assemblies includes the liquid crystal light valve and the optical compensation element described in any one of [A01] to [A13] that is disposed on at least one side of the liquid crystal light valve.

[C03] <<Liquid Crystal Projector Apparatus>>
A liquid crystal projector apparatus including:
　　a light source;
　　a first optical system that splits light from the light source into a plurality of optical paths;
　　a plurality of liquid crystal light valve assemblies that are arranged in the respective plurality of optical paths split by the first optical system;
　　a second optical system that couples rays of light from the plurality of liquid crystal light valve assemblies to a single optical path; and
　　a projection lens system that projects light from the second optical system onto a projection surface,
　　in which at least one of the plurality of liquid crystal light valve assemblies includes a liquid crystal light valve and the optical compensation element described in any one of [A01] to [A13] that is disposed on at least one side of the liquid crystal light valve.

REFERENCE SIGNS LIST

10 Optical compensation element
20 First member
121 First transparent substrate
122 First alignment film
123 First phase difference layer
124 First inorganic barrier layer
30 Second member
221 Second transparent substrate
222 Second alignment film
223 Second phase difference layer
224 Second inorganic barrier layer
40 Adhesive layer
41, 42 Sealing member
50 Liquid crystal light valve assembly
50A Liquid crystal light valve (spatial light modulator)
51 First substrate
52 Second substrate
53 Liquid crystal layer
54 TFT layer
55 Sealing member
56, 57 Polarizing plate
61, 62 Dust-proof glass
300 Liquid crystal projector apparatus
301 Light source
302 First fly-eye lens
303 Second fly-eye lens
305 Plano-convex lens
306, 310 Dichroic mirror
307, 314, 316 Reflector
308, 311, 317 Convex-flat lens
309, 312, 318 Optical modulator
313, 315 Relay lens
319 Cross prism
320a, 320b Interference filter
321 Projection lens system

The invention claimed is:

1. An optical compensation element, comprising:
　　a first member that includes a first transparent substrate, a first alignment film that is on the first transparent substrate, and a first phase difference layer that is on the first alignment film;
　　a second member that includes a second transparent substrate, a second alignment film that is on the second transparent substrate, and a second phase difference layer that is on the second alignment film;
　　a first inorganic barrier layer on a surface of the first phase difference layer, wherein
　　　　the surface of the first phase difference layer faces the second member,
　　　　the first inorganic barrier layer is on an entirety of the surface of the first phase difference layer,
　　　　the first inorganic barrier layer is also on a side surface of the first phase difference layer, and
　　　　the first inorganic barrier layer has a structure in which a plurality of $SiO_2$ layers with a first thickness value and a plurality of $Nb_2O_5$ layers with the first thickness value are laminated;
　　a second inorganic barrier layer on a surface of the second phase difference layer, wherein
　　　　the surface of the second phase difference layer faces the first member, and
　　　　the second inorganic barrier layer has a structure in which a plurality of $SiO_2$ layers with a second thickness value and a plurality of $Nb_2O_5$ layers with the second thickness value are laminated; and
　　an adhesive layer that bonds with the first inorganic barrier layer and the second inorganic barrier layer.

2. The optical compensation element according to claim 1, wherein the first phase difference layer and the second phase difference layer include a polymerizable liquid crystal composition.

3. The optical compensation element according to claim 1, wherein the first inorganic barrier layer is on a part of the surface of the first phase difference layer.

4. The optical compensation element according to claim 1, wherein the second inorganic barrier layer is on a part of the surface of the second phase difference layer.

5. The optical compensation element according to claim 1, wherein
　　a thickness direction of the first inorganic barrier layer is a Z1-axis,
　　two axes orthogonal to the Z1-axis are an X1-axis and a Y1-axis,
　　the X1-axis and the Y1-axis are orthogonal to each other, and
　　$n1X=n1Y>n1-Z$ is satisfied, when a refractive index of the first inorganic barrier layer along the Z1-axis is $n1-Z$, a refractive index of the first inorganic barrier layer along the X1-axis is $n1-X$, and a refractive index of the first inorganic barrier layer along the Y1-axis is $n1-Y$.

6. The optical compensation element according to claim 1, wherein
　　a thickness direction of the second inorganic barrier layer is a Z2-axis, two axes orthogonal to the Z2-axis are an X2-axis and a Y2-axis, the X2-axis and the Y2-axis are orthogonal to each other, and n2−X=n2−Y>n2−Z is satisfied, when a refractive index of the second inorganic barrier layer along the Z2-axis is n2−Z, a refractive index of the second inorganic barrier layer along the X2-axis is n2−X, and a refractive index of the second inorganic barrier layer along the Y2-axis is n2−Y.

7. The optical compensation element according to claim 1, wherein an angle between an optical axis of the first alignment film and an optical axis of the second alignment film is approximately 90 degrees.

8. The optical compensation element according to claim 1, wherein the second inorganic barrier layer is on an entirety of the surface of the second phase difference layer.

9. The optical compensation element according to claim 8, wherein the second inorganic barrier layer is also on a side surface of the second phase difference layer.

10. A liquid crystal light valve assembly, comprising:

a liquid crystal light valve; and an optical compensation element on at least one side of the liquid crystal light valve, wherein the optical compensation element comprises:

a first member that includes a first transparent substrate, a first alignment film that is on the first transparent substrate, and a first phase difference layer that is on the first alignment film;

a second member that includes a second transparent substrate, a second alignment film that is on the second transparent substrate, and a second phase difference layer that is on the second alignment film;

a first inorganic barrier layer on a surface of the first phase difference layer, wherein the surface of the first phase difference layer faces the second member, the first inorganic barrier layer is on an entirety of the surface of the first phase difference layer, the first inorganic barrier layer is also on a side surface of the first phase difference layer, and the first inorganic barrier layer has a structure in which a plurality of $SiO_2$ layers with a first thickness value and a plurality of $Nb_2O_5$ layers with the first thickness value are laminated;

a second inorganic barrier layer on a surface of the second phase difference layer, wherein the surface of the second phase difference layer faces the first member, and the second inorganic barrier layer has a structure in which a plurality of $SiO_2$ layers with a second thickness value and a plurality of $Nb_2O_5$ layers with the second thickness value are laminated; and an adhesive layer that bonds with the first inorganic barrier layer and the second inorganic barrier layer.

11. The liquid crystal light valve assembly according to claim 10, wherein the liquid crystal light valve includes a first polarizing plate, a first substrate, a liquid crystal layer, a second substrate, and a second polarizing plate, and the optical compensation element is between one of the first polarizing plate and the first substrate, the second substrate and the second polarizing plate, or the first polarizing plate and the first substrate, and the second substrate and the second polarizing plate.

12. The liquid crystal light valve assembly according to claim 11, wherein liquid crystal molecules that configure the liquid crystal layer have a pretilt state.

13. The liquid crystal light valve assembly according to claim 10, wherein the liquid crystal light valve includes a dust-proof glass plate, and the dust-proof glass plate is the optical compensation element.

14. A liquid crystal projector apparatus, comprising:

a light source;

a liquid crystal light valve assembly configured to receive light from the light source; and a projection lens system configured to project light emitted from the liquid crystal light valve assembly onto a projection surface, wherein the liquid crystal light valve assembly includes a liquid crystal light valve and an optical compensation element on at least one side of the liquid crystal light valve, the optical compensation element comprises:

a first member that includes a first transparent substrate, a first alignment film that is on the first transparent substrate, and a first phase difference layer that is on the first alignment film;

a second member that includes a second transparent substrate, a second alignment film that is on the second transparent substrate, and a second phase difference layer that is on the second alignment film;

a first inorganic barrier layer on a surface of the first phase difference layer, wherein the surface of the first phase difference layer faces the second member, the first inorganic barrier layer is on an entirety of the surface of the first phase difference layer, the first inorganic barrier layer is also on a side surface of the first phase difference layer, and the first inorganic barrier layer has a structure in which a plurality of $SiO_2$ layers with a first thickness value and a plurality of $Nb_2O_5$ layers with the first thickness value are laminated;

a second inorganic barrier layer on a surface of the second phase difference layer, wherein the surface of the second phase difference layer faces the first member, and the second inorganic barrier layer has a structure in which a plurality of $SiO_2$ layers with a second thickness value and a plurality of $Nb_2O_5$ layers with the second thickness value are laminated; and an adhesive layer that bonds with the first inorganic barrier layer and the second inorganic barrier layer.

15. The liquid crystal projector apparatus according to claim 14, further comprising:

a plurality of liquid crystal light valve assemblies;

a first optical system configured to split light from the light source into a plurality of optical paths; and a second optical system configured to couple rays of light from the plurality of liquid crystal light valve assemblies to a single optical path and emit the rays of light from the plurality of liquid crystal light valve assemblies to the projection lens system, wherein each liquid crystal light valve assembly of the plurality of liquid crystal light valve assemblies is arranged in each of the plurality of optical paths split by the first optical system, and at least one of the plurality of liquid crystal light valve assemblies includes the liquid crystal light valve and the optical compensation element.

* * * * *